US012573146B2

(12) United States Patent
Couleaud

(10) Patent No.: US 12,573,146 B2
(45) Date of Patent: Mar. 10, 2026

(54) PRODUCT PLACEMENT SYSTEMS AND METHODS FOR 3D PRODUCTIONS

(71) Applicant: Adeia Guides Inc., San Jose, CA (US)

(72) Inventor: Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 268 days.

(21) Appl. No.: 18/137,290

(22) Filed: Apr. 20, 2023

(65) Prior Publication Data

US 2024/0355050 A1     Oct. 24, 2024

(51) Int. Cl.
*G06T 17/00*     (2006.01)
*G06T 17/10*     (2006.01)
*G06T 19/20*     (2011.01)

(52) U.S. Cl.
CPC .............. *G06T 17/10* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 8,910,201 | B1 * | 12/2014 | Zamiska | .............. H04N 21/458 |
| | | | | 725/60 |
| 9,654,842 | B2 | 5/2017 | Sinha et al. | |
| 10,425,698 | B2 | 9/2019 | Briggs et al. | |
| 10,997,630 | B2 | 5/2021 | Pulido et al. | |
| 11,738,516 | B2 * | 8/2023 | Roca | ....................... G06T 19/20 |
| | | | | 700/98 |
| 2008/0007567 | A1 * | 1/2008 | Clatworthy | ............. G06T 15/00 |
| | | | | 345/619 |
| 2008/0012988 | A1 * | 1/2008 | Baharav | ............... H04N 21/254 |
| | | | | 375/E7.006 |
| 2013/0278592 | A1 * | 10/2013 | Kranzberg | .............. G06T 19/00 |
| | | | | 345/419 |
| 2015/0071613 | A1 * | 3/2015 | Dharssi | .............. G06Q 30/0241 |
| | | | | 386/278 |
| 2016/0117722 | A1 * | 4/2016 | Garcia | .............. G06Q 30/0251 |
| | | | | 705/14.49 |
| 2017/0085964 | A1 | 3/2017 | Chen | |
| 2018/0013977 | A1 * | 1/2018 | Martineau | ............ G06V 10/255 |
| 2018/0374276 | A1 * | 12/2018 | Powers | ................. G06T 17/205 |

(Continued)

OTHER PUBLICATIONS

"Chapter 2: The Graphics Pipeline", "Chapter 2: The Graphics Pipeline," Graphics Compendium, https://graphicscompendium.com/intro/01-graphics-pipeline.

(Continued)

*Primary Examiner* — Martin Mushambo
(74) *Attorney, Agent, or Firm* — HG LAW LLP

(57) ABSTRACT

Systems and methods for replacing a 3D container in a 3D scene with a replacement 3D object are described. A 3D scene is rendered, and a determination is made as to whether the 3D scene includes a 3D container. If it does, attributes and rules associated with the 3D container are obtained. A replacement 3D object that adheres to the obtained attributes and rules is selected. The selection may be based on replacement 3D objects from submission from object servers. The object servers may also bid to place the replacement 3D object. Once a replacement 3D object is selected, it is used to replace the 3D container at the time of rendering the 3D scene.

22 Claims, 21 Drawing Sheets

1500

(56)                    References Cited

U.S. PATENT DOCUMENTS

| | | | |
|---|---|---|---|
| 2021/0117685 A1* | 4/2021 | Sureshkumar ... | H04N 21/44016 |
| 2021/0201956 A1* | 7/2021 | Stephens ............ | G06Q 30/0641 |
| 2021/0383115 A1* | 12/2021 | Alon ....................... | A63F 13/77 |
| 2022/0180898 A1* | 6/2022 | Ahmed .................. | H04N 21/84 |

OTHER PUBLICATIONS

"Choosing and configuring a render pipeline and lighting solution", "Choosing and configuring a render pipeline and lighting solution," Unity Documentation, https://docs.unity3d.com/Manual/BestPracticeLightingPipelines.html.

"Film, Animation and Cinematics", "Film, Animation and Cinematics," Unity, https://unity.com/solutions/film-animation-cinematics.

"Graphics pipeline", "Graphics pipeline," Wikipedia: The Free Encyclopedia, https://en.wikipedia.org/wiki/Graphics_pipeline.

"Real-Time Filmmaking, Explained", "Real-Time Filmmaking, Explained," Unity, https://unity.com/solutions/real-time-filmmaking-explained.

"Rendering an Image of a 3D Scene: an Overview", "Rendering an Image of a 3D Scene: an Overview," Scratchapixel 3.0, https://www.scratchapixel.com/lessons/3d-basic-rendering/rendering-3d-scene-overview/rendering-3d-scene.html.

"What is Real Time Rendering and Why It Matters", "What is Real Time Rendering and Why It Matters," Easy Render, https://www.easyrender.com/a/what-is-real-time-rendering-and-why-it-matters.

"What is Real-Time 3D Rendering (and Why the Future of Digital Depends on It", "What is Real-Time 3D Rendering (and Why the Future of Digital Depends on It," PureWeb, https://protect-us.mimecast.com/s/UtDCCL9G5jfrYj5fqhsVj?domain=pureweb.com/.

Abarinova, Masha , "Amazon unveils Virtual Product Placement beta at NewFronts", Abarinova, Masha, "Amazon unveils Virtual Product Placement beta at NewFronts," Fierce Video, https://www.fiercevideo.com/advertising/amazon-unveils-virtual-product-placement-beta-newfronts (May 2, 2022).

Abarinova, Masha , "UFC, 4D Sight can digitally insert ads during live sport events", Abarinova, Masha, "UFC, 4D Sight can digitally insert ads during live sport events," Fierce Video, https://www.fiercevideo.com/advertising/ufc-4d- sight-can-digitally-insert-ads-during-live-sport-events, (Aug. 18, 2022).

Burke, Steve , "GPU Rendering & Game Graphics Pipeline Explained with nVidia", Burke, Steve, "GPU Rendering & Game Graphics Pipeline Explained with nVidia," Gamers Nexus, https://www.gamersnexus.net/guides/2429-gpu-rendering-and-game-graphics-explained, (May 10, 2016).

Wetzstein, Gordon , "The Graphics Pipeline and OpenGL II: Lighting and Shading, Fragment Processing", Wetzstein, Gordon, "The Graphics Pipeline and OpenGL II: Lighting and Shading, Fragment Processing," Stanford University, https://protect-us.mimecast.com/s/DEmkCKrG5ghNrE0HMN5wo?domain=stanford.edu.

* cited by examiner

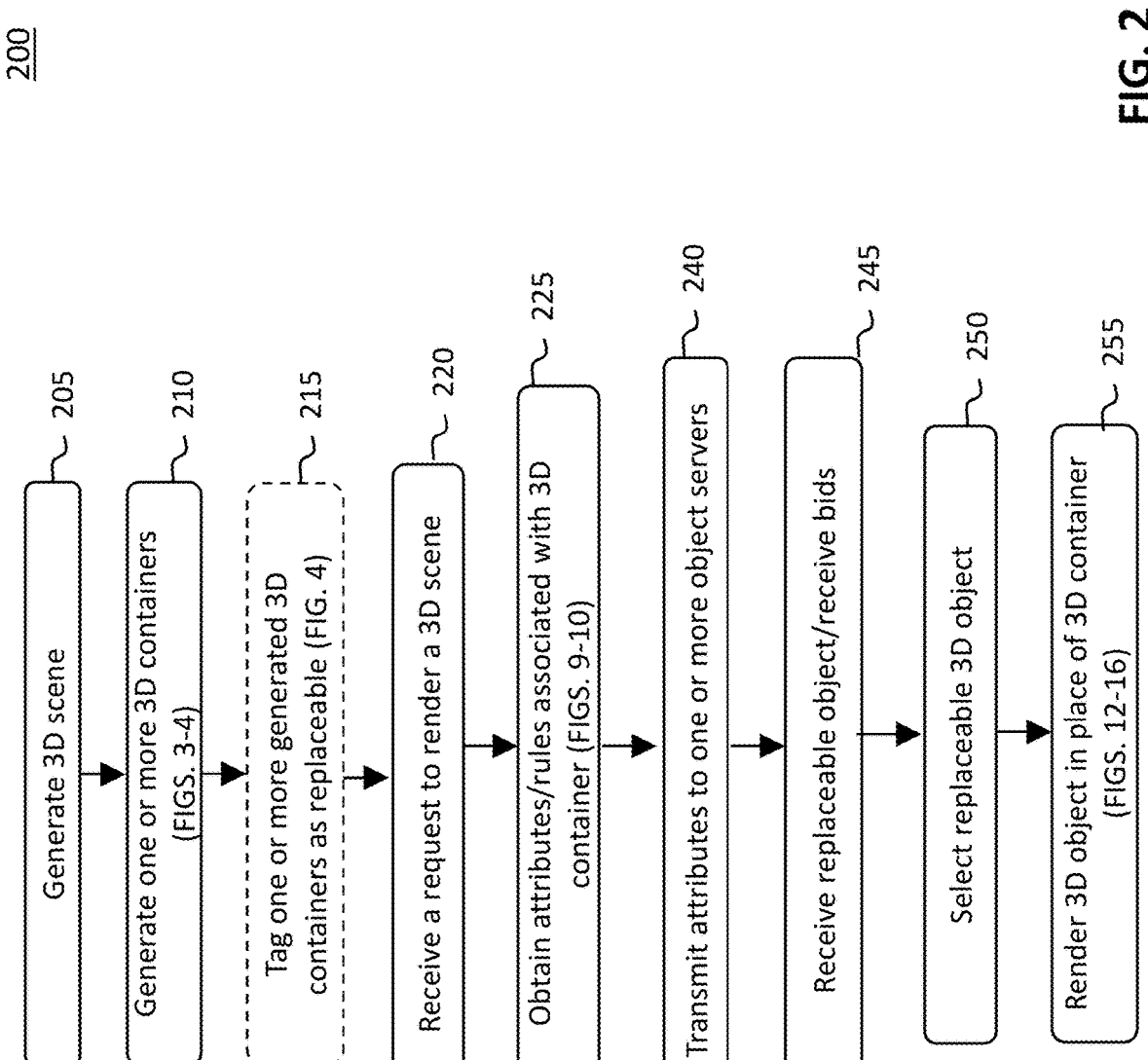

200

Generate 3D scene — 205

Generate one or more 3D containers (FIGS. 3-4) — 210

Tag one or more generated 3D containers as replaceable (FIG. 4) — 215

Receive a request to render a 3D scene — 220

Obtain attributes/rules associated with 3D container (FIGS. 9-10) — 225

Transmit attributes to one or more object servers — 240

Receive replaceable object/receive bids — 245

Select replaceable 3D object — 250

Render 3D object in place of 3D container (FIGS. 12-16) — 255

FIG. 2

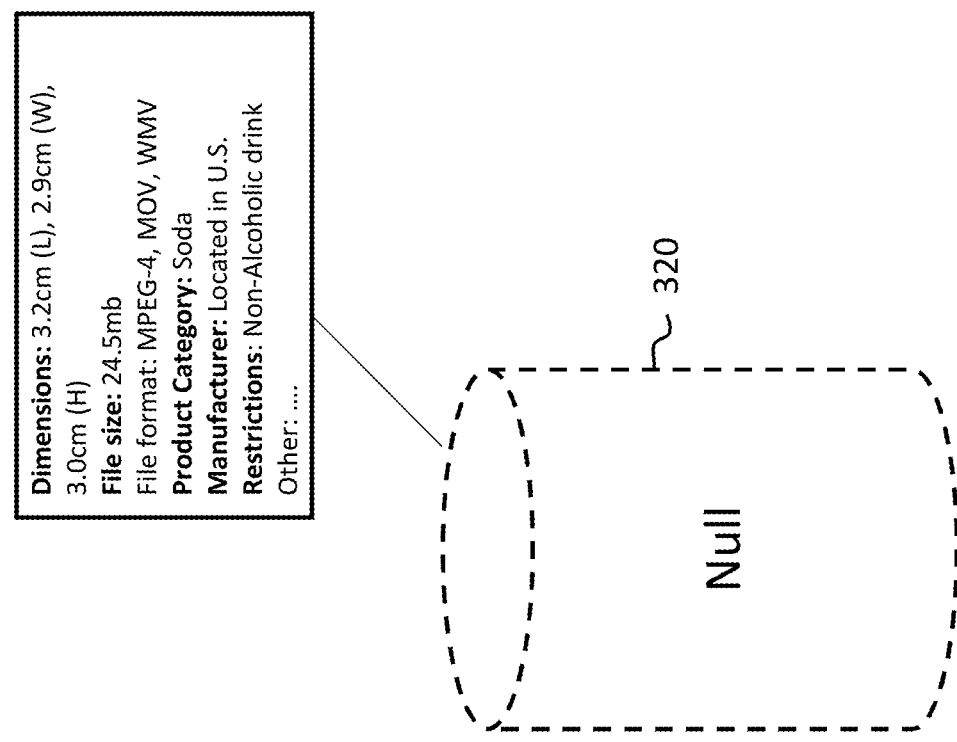
Dimensions: 3.2cm (L), 2.9cm (W), 3.0cm (H)
File size: 24.5mb
File format: MPEG-4, MOV, WMV
Product Category: Soda
Manufacturer: Located in U.S.
Restrictions: Non-Alcoholic drink
Other: ....
Null
320
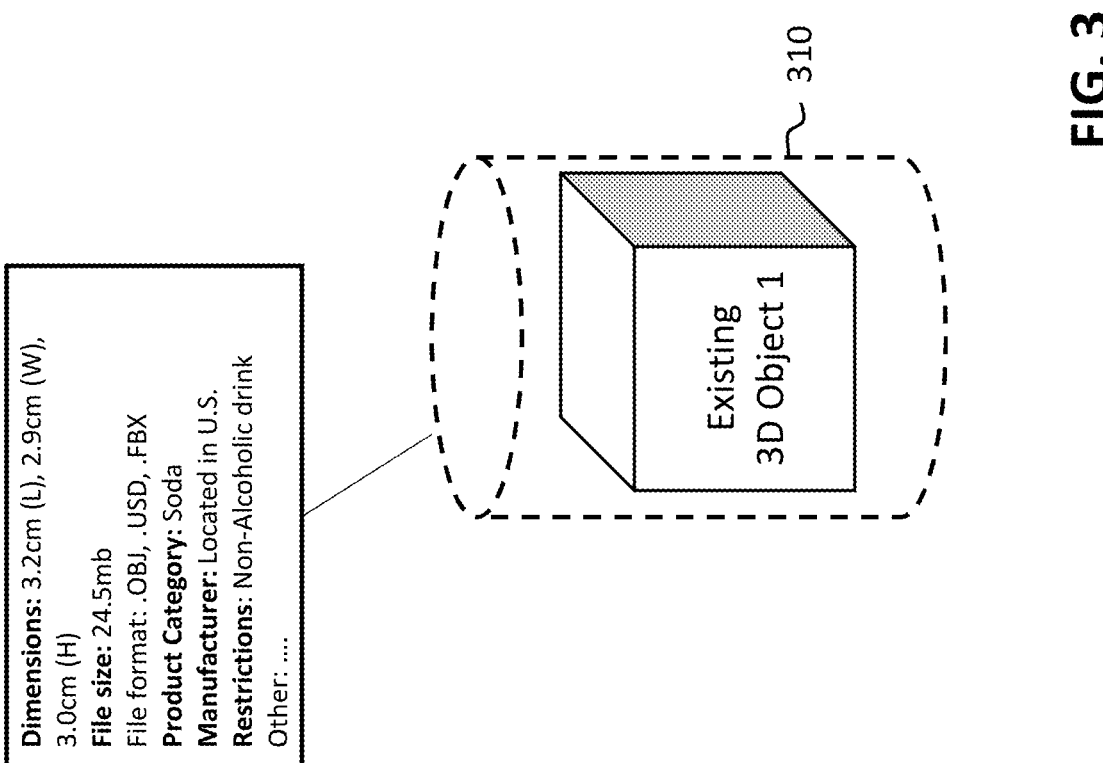
Dimensions: 3.2cm (L), 2.9cm (W), 3.0cm (H)
File size: 24.5mb
File format: .OBJ, .USD, .FBX
Product Category: Soda
Manufacturer: Located in U.S.
Restrictions: Non-Alcoholic drink
Other: ....
Existing 3D Object 1
310
FIG. 3

400

Replacement categories

Existence of a 3D container

410

Tagged 3D container

420

| | Replacement 3D Object Rules |
|---|---|
| A | Object cannot be related to alcohol |
| B | Object shall be appropriate for children under 14 |
| C | Object cannot be a competitor product |
| D | Object cannot be priced above $50 |
| E | Object shall be offered for sale within predetermined distance where the media asset is to be consumed |
| F | Object shall have a consumer rating of 7.0 or above |
| G | Other rules ... |

FIG. 10

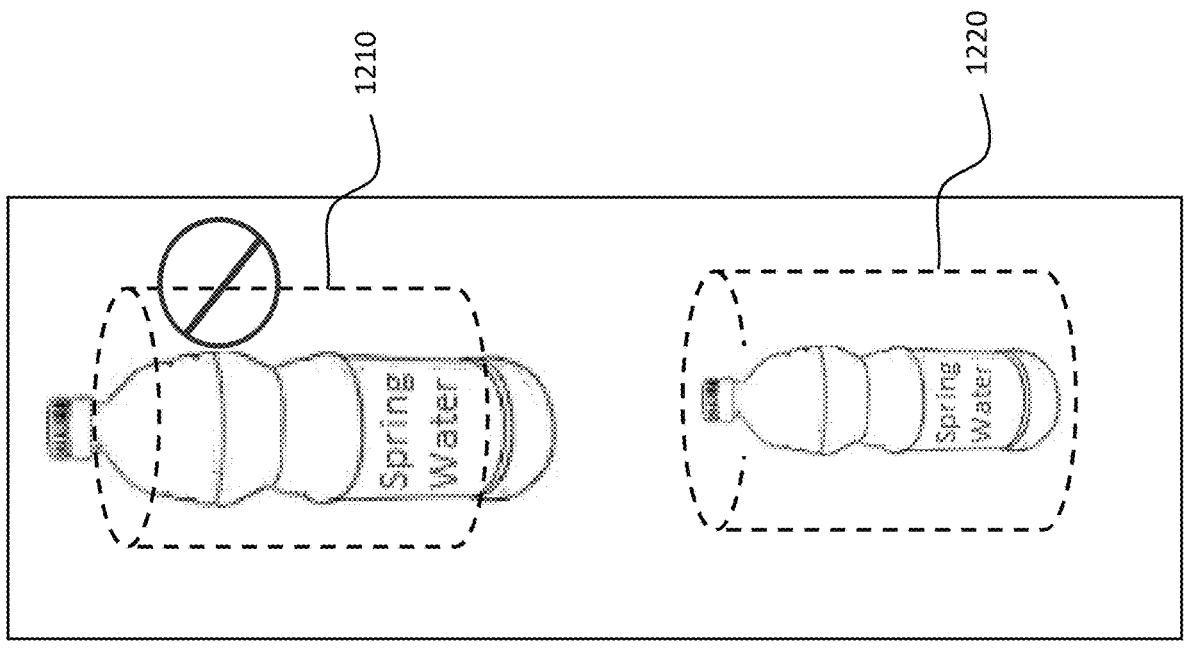
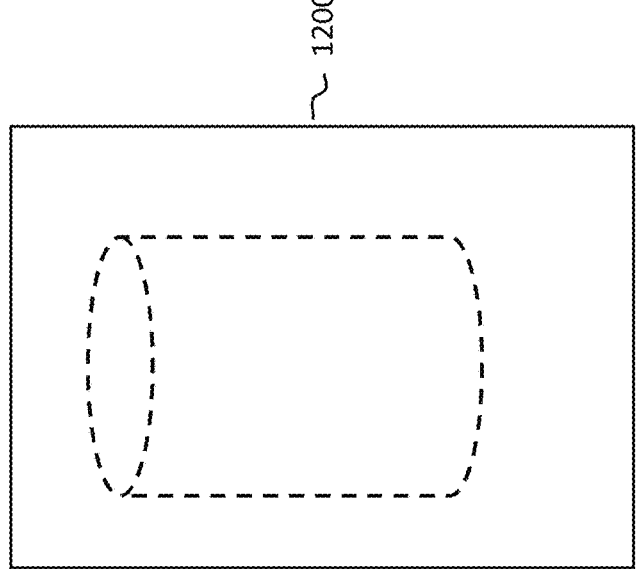
FIG. 12

```
{
    "asset" : { ···
    },
    "extensionsUsed" : [ ···
    ],
    "scene" : 0,
    "scenes" : [ ···
    ],
    "nodes" : [ ···
    ],
    "materials" : [ ···
    ],
    "meshes" : [ ···
    ],
    "textures" : [ ···
    ],
    "images" : [ ···
    ],
    "accessors" : [ ···
    ],
    "bufferViews" : [ ···
    ],
    "samplers" : [ ···
    ],
    "buffers" : [ ···
    ]
}
```

FIG. 13

```
"meshes" : {
    "name" : "Product_Placement",
    "primitives" : [
        {
            "attributes" : {
                "POSITION" : 0,
                "NORMAL" : 1,
                "TEXCOORD_0" : 2
            },
            "indices" : 3,
            "material" : 0
        }
    ],
    "extensions" : {
        "productPlacementExtension": {
            "ReplaceableObject" : true,
            "ReplacementFamily" : "CounterTopObject"
        }
    }
},
{
    "name" : "Normal_Object",
    "primitives" : [
        {
            "attributes" : {
                "POSITION" : 0,
                "NORMAL" : 1,
                "TEXCOORD_0" : 2
            },
            "indices" : 3,
            "material" : 1
        }
    ]
},...
```

Create original 3D scene — 1505

Identify 3D containers in 3D scene in which product placement objects can be inserted — 1515

White label 3D scene by rendering the product placement object — 1520

<u>1700</u>

Acquire frame 1705

Does frame contain a 3D container (FIG. 20) 1710

NO

YES

Replace frame by a frame that includes a replacement 3D object 1715

Serve frame 1720

2000

2016 MICROPHONE

2014 SPEAKERS

2012 DISPLAY

2010 USER INPUT INTERFACE

2006 PROCESSING CIRCUITRY

2004

2008 STORAGE (E.G., RAM, ROM, HARD DISK, REMOVABLE DISK, ETC.)

2002

PRODUCT PLACEMENT SYSTEMS AND METHODS FOR 3D PRODUCTIONS

FIELD OF INVENTION

Embodiments of the present disclosure relate to inserting 3D virtual objects in place of a 3D container in a 3D scene for or during playback of the 3D scene, where the 3D scene is to be rendered (e.g., as a video program) and wherein insertion of the 3D virtual objects is performed, for example, at the time of rendering. Some embodiments or aspects may relate to other features, functionalities, or fields.

BACKGROUND

Traditional Advertisement in video productions (TV shows, movies) can be perceived as intrusive, and ad fatigue can occur. An advertisement is usually presented as a one or set of clips decorrelated from the main program being watched shown before, during or after that program. In certain countries, there are strict regulations in place that limit the frequency and the number of ads that can be presented to viewers at certain hours of the day which greatly decrease inventory for advertisers. Also, there may be restrictions on the type of advertisement that can be shown. For example, advertisement for tobacco or alcoholic beverages has severe restrictions in certain countries.

Product placement is a way to increase advertisement opportunities, decrease ad fatigue and improve ad experience for the viewer. However, current product placement techniques can be limited. One such limitation today, such as in a video production, is that the process is cumbersome and manual. Due to processing constraints typical product placements are rendered in advance.

Yet another limitation in current systems is that product placement insertions are performed in post-production when the main asset (the original video) has already been post-produced, forcing the manual insertion of the product and the manual adjustment of the rest of the scene parameters (lighting, reflections, etc.).

As such, there is a need for a product placement method that overcomes some of the above-mentioned limitations.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 2 is a flowchart of a process of inserting a replacement 3D object in place of a 3D container in a 3D scene, in accordance with some embodiments of the disclosure;

FIG. 3 is a block diagram of a 3D container and attributes and rules associated with the 3D container, in accordance with some embodiments of the disclosure;

FIG. 10 is a block diagram of examples of rules associated with the 3D container, in accordance with some embodiments of the disclosure;

FIG. 12 is an example of selecting a replacement 3D object that conforms to the required attributes of the 3D container, in accordance with some embodiments of the disclosure;

FIGS. 13 and 14 are exemplary illustrations of how a container with a replaceable tag appended to it would look in glTF format, in accordance with some embodiments of the disclosure;

DETAILED DESCRIPTION

In accordance with some embodiments disclosed herein, some of the above-mentioned limitations are overcome by replacing a 3D container in a 3D scene by a replacement 3D object at the time of rendering. The process includes generating scene data representing a 3D scene on a display (also referred to as generating a 3D scene). A 3D container is also generated in the 3D scene. There may be one or many 3D containers in a 3D scene. The 3D container has attributes and rules associated with it. In an embodiment, these attributes and rules define what can and cannot be used to replace the 3D container. The attributes and rules may be used as a template in searching and selecting a replacement 3D object that adheres to the attributes and rules. The methods include identifying one or more replacement 3D objects that adheres to the attributes and rules of the 3D container and selecting the replacement 3D object. The one more replacement 3D object may be obtained from object servers, such as via a bidding process. In some embodiments, the replacement 3D objects may be obtained from one or more object servers and may be stored in a repository or library that can be queried by the 3D rendering engine. Once a replacement 3D object is selected, the 3D container may be replaced with the selected 3D object (e.g., at or near the time of rendering). Prior to rendering or during rendering, enhancements such as lighting, shadows, and other material properties associated with the replacement 3D object may be determined or changed such that the replacement 3D object blends in with its surrounding environment.

Figure 19:
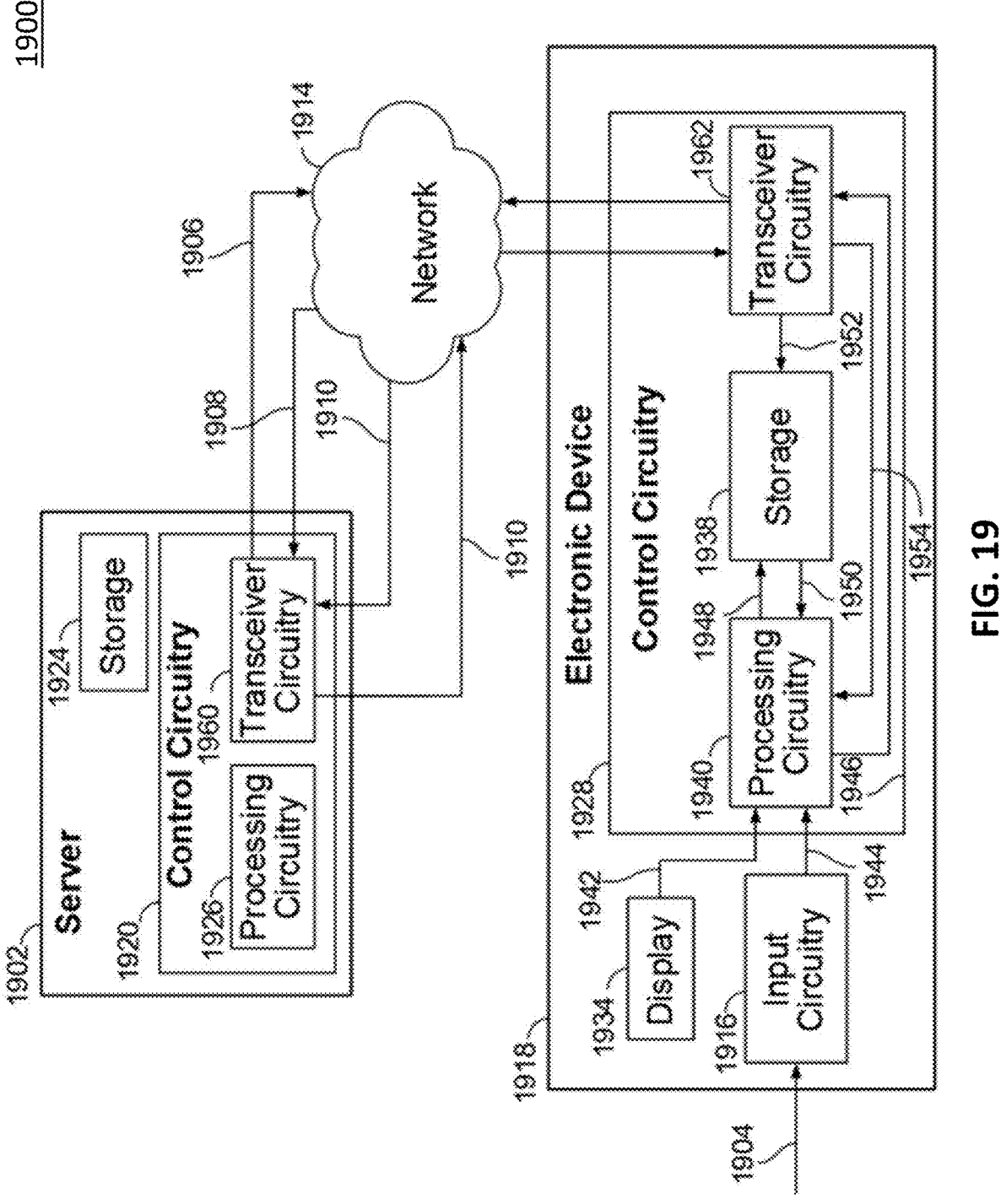
FIG. 19 is a block diagram of an example system for replacing a 3D container in a 3D scene with a replacement 3D object, in accordance with some embodiments of the disclosure.
Figure 20:
FIG. 20 is a block diagram of an electronic device used for rendering the replacement 3D object in the 3D scene, in accordance with some embodiments of the disclosure.

The description below references various figures. FIGS. 1, 2, and 15-17 depict example methods or processes that may be implemented. FIGS. 3-12 and 18 depict example entities described herein, such as example containers, attributes, specifications, rules, objects, etc. FIGS. 13 and 14 depict example code for implementing techniques described herein. Finally, FIGS. 19-20 depict example systems for implementing the disclosed techniques. A "3D scene" may be thought of as a computer-generated representation of objects and environments in three dimensions. Once rendered, a 3D scene may be viewed from a particular perspective or camera angle. In a rendered 3D scene, objects can be positioned, rotated, and scaled in three dimensions, allowing for a more realistic and immersive experience. A rendered 3D scene may include lighting and shadows, textures, and special effects to enhance the visual realism. When viewed from the appropriate angle or perspective, a rendered 3D scene can appear as if it is a real-world environment that the viewer can interact with or explore.

Prior to rendering, a 3D scene may be represented by scene data. The scene data may include properties, such as material properties (e.g., for materials to be depicted in the scene to be rendered). The scene data may include the geometry, textures, materials, lighting, and camera settings, etc. that will be used by a rendering engine to create the final image, images, video, or animations of the rendered 3D scene (which may be rendered for 2D display). Representations of the example 3D containers described herein may be included in scene data that is generated (e.g., by an editor) and used (e.g., by an engine) to render a 3D scene.

In some embodiments, prior to rendering the scene data representing the 3D scene (e.g., after an instruction for rendering has been received but prior to beginning rendering), the engine identifies a 3D container within the scene data and replaces it with a replacement 3D object.

In some embodiments, the engine renders, or pre-renders the scene data, including the 3D container. The rendered 3D container may be marked or tagged as a replaceable object. Then, at (or before) a time of rendering for a particular user, the engine may replace the rendered 3D container with a replacement 3D object and may re-render the 3D scene.

Scene data representing a 3D scene may be created using specialized software (e.g., an editor) and can be used in various applications such as video games, movies, and virtual reality simulations.

As mentioned, after a 3D scene has been designed (e.g., by an editor), it may be rendered by a rendering engine (e.g., a gaming engine). A rendering engine (sometimes simply referred to as an "engine" or "3D engine") may be designed to efficiently process scene data representing the 3D scene and to apply various stages of the rendering pipeline to produce the output that make up the final rendering. The output may be 2D output (e.g., that when rendered provides an illusion of depth), and may include an image, images, video, or animations.

In one approach, a 3D scene is rendered using a process called a graphics or rendering pipeline, which may involve several stages to create the rendered 3D scene from the scene data. The rendering pipeline may be thought of as a process by which a 3D scene is transformed into a 2D image or set of images, for example. Current implementations of rendering pipelines involve steps such as: (i) creating and positioning, based on the scene data, 3D objects in a virtual space; (ii) adding a light source to illuminate the objects, and applying textures to the surfaces to simulate different materials; (iii) calculating the shading of the objects based on the interaction of light with their textures and materials; (iv) clipping or culling objects that are outside the camera's view or hidden from view; (v) rasterizing the 3D scene into pixels on the screen to generate the final 2D image or set of images; and (vi) applying additional effects, such as color correction and depth-of-field, to enhance the final image or set of images that make up the rendered 3D scene. Generally speaking, the rendering pipeline can be a complex process that may require powerful hardware and specialized software to produce high-quality 3D scenes. In some instances, the 3D container within the scene data is replaced with the replacement 3D object prior to the rendering pipeline beginning (e.g., prior to the 3D objects being created from the 3D scene data).

In some instances, the described engine may render interactive 3D scenes (e.g., which may include a replacement 3D object). The engine may render interactive the scene data (e.g., including the replacement 3D object) representing the 3D scenes in real-time, resulting in interactive, immersive experiences (e.g., gameplay experiences) if desired. Interactive content rendering pipelines (e.g., game rendering pipelines) may account for limitations of real-time rendering, such as limited processing power, memory, and bandwidth. The described rendering engines may implement known optimization techniques such as level of detail (LOD) management, occlusion culling, and dynamic batching to improve performance and maintain a consistent frame rate. These optimizations can help ensure that the 3D scene is rendered in real-time and with minimal delay if desired, allowing users (e.g., players) to interact with a game world and its objects seamlessly.

Figure 1:
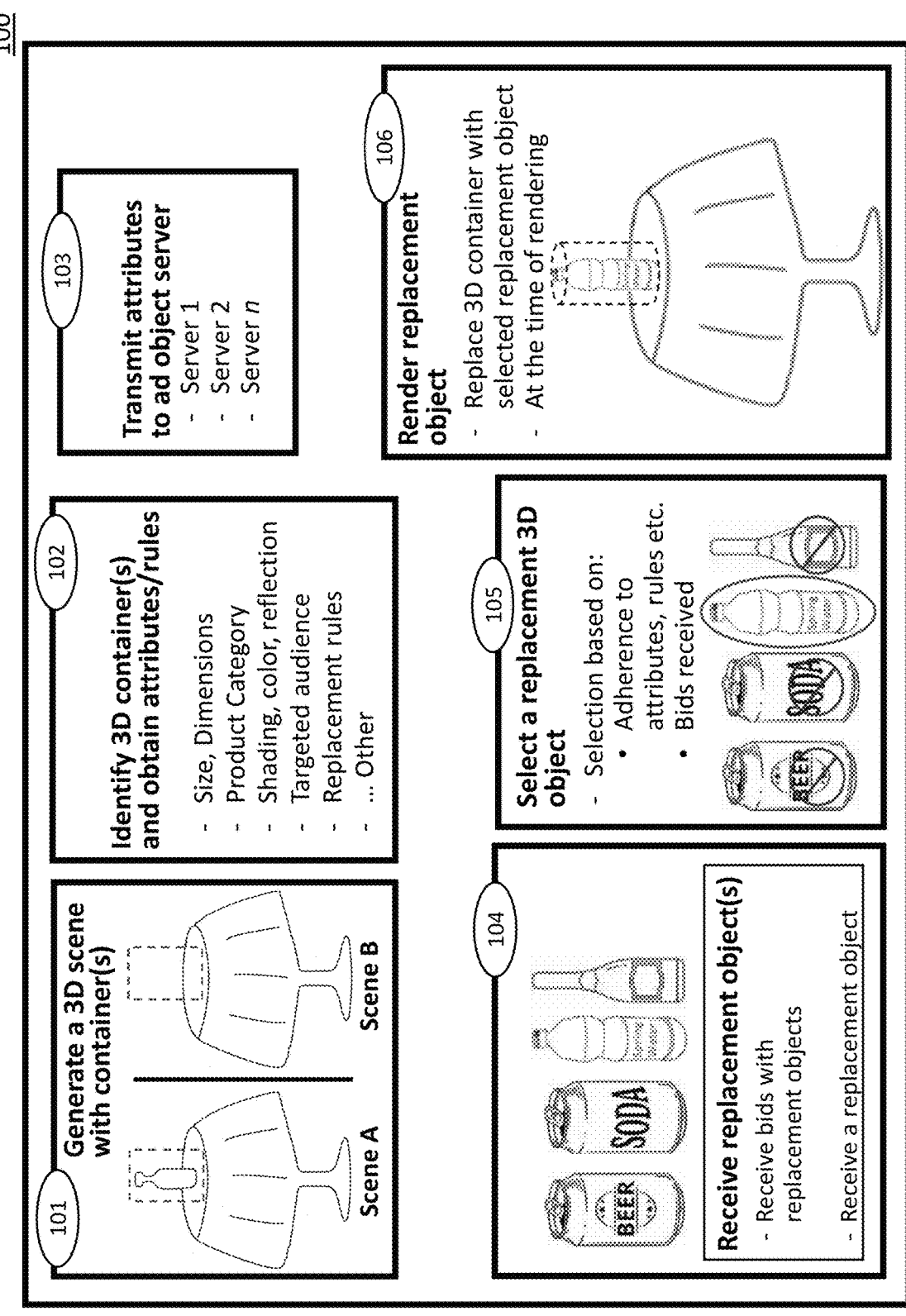
FIG. 1 is a block diagram of a process of inserting a replacement 3D object in place of a 3D container in a 3D scene, in accordance with some embodiments of the disclosure.

Turning to the figures, FIG. 1 is a block diagram of a process 100 of inserting a replacement 3D object in place of a 3D container in a 3D scene, in accordance with some embodiments of the disclosure. The process 100 may be implemented, in whole or in part, by systems or devices such as those shown in FIGS. 19-20. One or more actions of the process 100 may be incorporated into or combined with one or more actions of any other process or embodiments described herein. The process 100 may be saved to a memory or storage (e.g., any one of those depicted in FIGS. 19-20) as one or more instructions or routines that may be executed by a corresponding device or system to implement the method 100.

In some embodiments, at block 101, a 3D scene is displayed on an electronic device, such as the electronic device depicted in FIG. 20. The 3D scene may be generated by an editor, such as the editor depicted in FIG. 21. In some embodiments, a scene designer may design the 3D scene, which may include none or one or more 3D container in one or more locations in the 3D scene.

The 3D scene may be a media asset, such as a video program of a movie, sitcom, advertisement, television show, a game, or any other type of programming. It may also be an image or an audio file. It may also be a live broadcast or a DVR media asset.

The 3D scene may include a container. In some embodiments, the 3D container defines a location and space in the 3D scene where a replacement 3D object can be inserted. The 3D container can be as simple as a virtual rectangular box defining the space or envelope in which a replacement 3D object can be inserted. The 3D container may also be of other shapes, such as a 3D cube, cylinder, parallelepiped, or any other 3D shape. The 3D container is generated by an editor, such as the editor depicted in FIG. 21, and may be designed by the scene designer. The 3D container may be a template that includes attributes and rules that may be followed when a replacement 3D object is to be inserted in the 3D container.

In some embodiments, one or more of the attributes associated may be thought of as specifications for a replacement 3D object that is to be later inserted (e.g., by a rendering engine) in the 3D scene, at or around the time of rendering. The attributes associated with a 3D container may include dimensions, coordinates, size, location in the 3D scene (e.g., a 3D coordinates for a point, such as a centroid of the 3D container; 3D coordinates for points, lines, or surfaces of the 3D container; etc.), color of the replacement 3D object, product category of the replacement 3D object, or any other attribute, such as the attributes listed in FIG. 9, that the scene designer associates with the 3D container. In some embodiments, a replacement 3D object that is to be inserted in place of the 3D container may be required to adhere to the attributes and in other embodiments, the scene designer may indicate a flexibility window or range for certain attributes. For example, the scene designer may have inputted rules associated with each attribute, such as size of the replacement 3D object must fit within a space or envelope defined by the 3D container however, the format of the 3D object description that is to be inserted as the replacement 3D object may be acceptable in any of a variety of file formats listed. Whatever the limitations may be for the attributes, the 3D container, with the attributes, in general are to be used as a template or defined space for determining which replacement 3D object can be inserted in place of the 3D container.

The 3D container may indicate a location in the 3D scene where the replacement 3D object may be inserted. For example, specific coordinates, location, may be associated with the 3D container and such coordinates, location etc. may define where in the 3D scene a replacement 3D object can be inserted. For example, the coordinates within the 3D scene of the corners, lines, and surfaces of the 3D container may define the space within which a replacement 3D object can be inserted.

In some embodiments, the scene designer may include rules associated with the 3D container on what types of replacement 3D object can be inserted in its place. These rules may allow certain commercial products and may restrict others. These rules may be provided via an editor, such as the editor 2105 shown in FIG. 21, and may be stored to memory. These rules may be evaluated at or around a time of rendering (e.g., by an engine such as the engine 2120 shown in FIG. 21). The output of that evaluation may indicate a replacement 3D object to insert into a scene, or a set of criteria for making such a selection. The rules, as depicted in FIG. 10, for example, may include geographical, pricing, parental guidance, competitor, product location, product category, alcohols and tobacco, sex, racial and controversial, political and other type of restrictions on the type of replacement 3D objects, and products associated with the replacement 3D object that can be inserted into the 3D container. Product category, for example, may include a type of products, such as sodas, TV shows, or it may include types of objects that logically suit the environment, such as eggs, juice, and milk in a refrigerator environment (and not a table lamp or a cat that do not belong in a refrigerator). The rules may also restrict depiction of certain people, products, companies, that the designer of the 3D container and 3D scene prevents from being inserted.

The rules may require the control or processing circuitry, such as the control or processing circuitry shown in FIGS. 19-20, to monitor ratings of products that are to be inserted as a replacement 3D object, and if the rating falls below a threshold, the rules may automatically remove the replacement 3D object. For example, a replacement 3D object (e.g., a 3D shampoo bottle in this example) may be inserted in place of a 3D container (e.g., by the engine). The 3D shampoo bottle may have been selected and inserted based on the engine determining that the 3D shampoo bottle meets the attributes listed by the 3D container (and/or the attributes of the 3D container). Subsequent to being inserted, or prior to being inserted, if monitoring of the shampoo results in a determination that either the shampoo dropped in ratings based on consumer reviews, that there has been a recall of the shampoo by the manufacturer, or the regulatory authorities, such as CDC, FDA etc. has put some restriction on use of the product, or any other negative reason for which the shampoo is viewed in negative light in the public, then the control circuitry in FIGS. 19-20 may automatically prevent insertion of the replacement 3D object or if already inserted, then remove it from subsequent frames of the 3D scene that have not yet been rendered.

Likewise, subsequent to being inserted, or prior to being inserted, if the replacement 3D object is an object depicting a certain individual or celebrity, and monitoring of the celebrity results in a determination that either the celebrity has committed a shameful act or a crime which would lower the brand value of the 3D scene of other objects presented in the 3D scene, then the control circuitry in FIGS. 19-20 may automatically prevent insertion of the replacement 3D object.

In some embodiments, as further described in FIG. 3, the 3D container may be placed in a location and space in the 3D scene that includes an existing 3D object and in other embodiments, the container may be placed in a location and space in the 3D scene that does not include an existing object but rather presents an opportunity to insert a replacement 3D object. In the embodiments where the 3D container includes an existing object, as further described in FIG. 3, the 3D container may be placed in a location and space in the 3D scene that includes an existing 3D object, such as the existing 3D object in scene A of block 101 in FIG. 1. In this embodiment, the 3D container envelopes or encompasses the existing object within it, such as the television within the 3D container 610 in FIG. 6. When such 3D container envelopes, encompasses, or includes an existing 3D object, when the 3D container is replaced with replacement 3D object, the 3D container and all its contents, i.e., the existing object, are replaced by the replacement 3D object. In other embodiments, the 3D container may be a null space where no other object is placed, such as in scene B of block 101 in FIG. 1.

In a 3D scene, in some embodiments, there may be only a single 3D container while in other embodiments the 3D scene may include multiple 3D containers.

Figure 4:
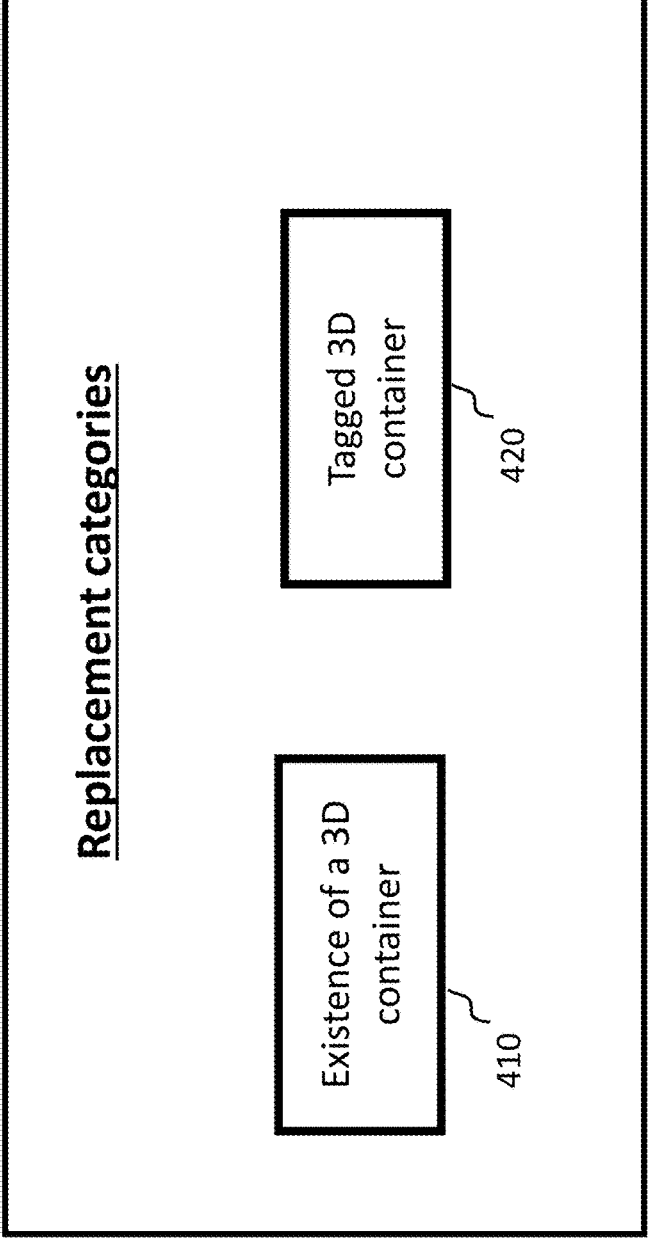
FIG. 4 is a block diagram of replacement categories for replacing a 3D container or object in the 3D scene with the replacement 3D object, in accordance with some embodiments of the disclosure.

In some embodiments, there may be a few options relating to replacement of a 3D container in a 3D scene. These options, as depicted in FIG. 4, may include, A) existence of the 3D container in a 3D scene or B) a tagged container in the 3D scene.

In some embodiments, the existence of a 3D container in a 3D scene is indicative of a replacement opportunity. In other words, whenever the scene designer, using the editor, such as the editor depicted in FIG. 21, designs a 3D container into the 3D scene, the 3D container can be marked, tagged, or otherwise identifiable such that the engine understands that the 3D container can be replaced by a replacement 3D object. Depending on the embodiment, the 3D container may be replaced prior to generating a rendered 3D scene, or it may be replaced after an initial rendering (e.g., wherein 3D scene is rendered with the 3D container included and tagged) and prior to a final rendering (wherein the 3D container has been replaced by a replacement 3D object). Pre-rendering may be beneficial to reduce the resources (e.g., bandwidth, processing, etc.) needed to render the final 3D scene with the replacement 3D object included.

In other embodiments, the existence of a 3D container in a 3D scene by itself may not be indicative of a replacement opportunity, however, if the 3D container is tagged as replaceable, then such a tagging may be indicative of the replacement opportunity. In other words, whenever the scene designer, using the editor, such as the editor depicted in FIG. 21, designs a 3D container into the 3D scene, the 3D containers may be tagged as replaceable and only those that are tagged as replaceable may be replaced by a replacement 3D object. There may be many reasons for the 3D scene designer to tag 3D containers, for example, the scene designer may want to preserve certain key elements of a scene and as such only tag those elements of the scene that are not key or essential with a tagged 3D container thereby signaling that such containers are replaceable.

Referring to block 101 in FIG. 1, using an editor, a video program resulting of the rendering of the 3D scene is displayed. In other words, video program resulting of the scene data representing the 3D scene is displayed. This may be a 3D scene that is in the process of being built or designed by a designer. The 3D scene may include a 3D container, as indicated by the dotted line in Scenes A and B of block 101. The designer may place the 3D container in the 3D scene as a "holding spot" for a yet-to-be-determined replacement 3D object (e.g., a replacement object selected to target the interests of the viewer, player, or user at the time of rendering). The two options presented in block 101, in one embodiment, may include a 3D scene (Scene A) where the 3D container includes an existing object, which in this embodiment is a bottle, and in another embodiment, the 3D container may be empty and not include an existing object (Scene B). Regarding Scene A, this existing object may serve as a default object to be displayed if no suitable replacement object is identified by the engine at the time of rendering, for example.

At block 102, the control circuitry 1920 and/or 1928 may identify attributes and rules associated with the 3D container. These attributes and rules may include, for example, size, dimensions, product category, material properties targeted audience, and other replacement rules that are to be adhered to in a replacement 3D object.

The attributes may be used, in some embodiments, to identify a replaceable object in the 3D scene. In some embodiments, a replaceable object is a special object in the scene that will be replaced by a product placement object of similar properties (volume, contact surface) and family at rendering time. The family or product family is defined to include 3D objects that are interchangeable and of the same type or product category, such one type of soda brand for another which are interchangeable. On the other hand, items that are not interchangeable may include replacing a coffee machine, that is in a 3D container, with a replacement 3D object, which is a car, which is not interchangeable. However, if it were to be replaced by a Nespresso coffee machine, that would acceptable since they are of same type and product category and as such interchangeable.

In other embodiments, the replaceable object identified in the 3D scene may be skinnable. For example, there may be a single 3D soda can or bottle that may be inserted into a 3D scene at the time of rendering. In addition to the 3D rendering engine, such as the 3D rendering engine depicted in FIG. 21, selecting this can object at the time of rendering based on the 3D container, the 3D rendering engine may skin the soda can as appropriate (e.g., it may be skinned as either Coke or Pepsi can, depending on who bid the highest for the replacement 3D object).

In yet other embodiments, the entire replaceable object in the 3D scene may be replaced and in other embodiments only a portion of the attribute of an object within a replacement container can be replaced.

At block 102, the control circuitry 1920 and/or 1928 may identify all the 3D containers in the 3D scene, such as the 3D scene in block 101. Although only one container is used as an example for describing the process, the embodiments are not so limited and multiple containers may also be present in a 3D scene.

The control circuitry 1920 and/or 1928 may also determine that some of the rules associated with the 3D container, that are to be adhered to in the replacement 3D object, include (as an example): a product type, blacklisted, banned, discontinued, or restricted products. Although several rules and subrules may be generated by the scene designer, or automatically generated by control circuitry 1920 and/or 1928 while executing an artificial intelligence and/or machine learning algorithm, only some exemplary rules are used to describe the process of FIG. 1. The control circuitry 1920 and/or 1928, may determine that the product category of the 3D container in block 101 is water bottle or brands of water and accordingly apply the rules when analyzing and selecting a replacement 3D object to replace the 3D container.

In one embodiment, at block 103, the control circuitry 1920 and/or 1928 may transmit the attributes and rules associated with the 3D container to one or more object servers (e.g., ad servers in some embodiments). These object servers (or ad servers) may be hosted by separate institutions, ad agencies, marketing companies, television programming entities, ad creators, replacement object creators, manufacturers of commercial products, such as manufacturers of automobiles, smart home products, media assets etc.

In response to transmitting the attributes and rules associated with the 3D container to one or more object servers, the control circuitry 1920 and/or 1928, at block 104, may receive one or more replacement 3D objects from one or more object servers. The control circuitry 1920 and/or 1928 may analyze the received replacement 3D objects to determine if the received replacement 3D objects meet the criteria of set by the attributes and rules of the 3D container.

In other embodiments, the control circuitry 1920 and/or 1928 may request each object server to submit a bid with the replacement 3D object. The control circuitry 1920 and/or 1928 may identify what contents and information is to be submitted with the bid, such as, for example, price, details of which attributes are adhered to, availability of a product that is associated with the submitted replacement 3D object in the market etc. It may also set any other requirements as desired by the 3D scene creator. The bidding process may allow product placement to be monetized the same way traditional ads are today with little to no change to the existing ad infrastructure.

At block 104, the control circuitry 1920 and/or 1928 may determine whether a replacement 3D object meets the criteria of set by the attributes and rules on the 3D container. The control circuitry 1920 and/or 1928 may also analyze bids, if such were requested. The control circuitry 1920 and/or 1928 considering all the attributes and rules, and bids, may select a replacement 3D object at block 105. In some embodiments, the selected replacement 3D object(s) obtained from one or more object servers may be stored in a repository or library that can be queried by the 3D rendering engine.

As depicted at block 105, the control circuitry 1920 and/or 1928 may select the spring water bottle and reject all other replacement 3D objects that were received by the object servers. As depicted, the control circuitry 1920 and/or 1928 may reject replacement 3D objects that relate to beer, soda, and champagne, since they are not of the same product category or are alcoholic drinks prohibited by the rules.

Figure 21:
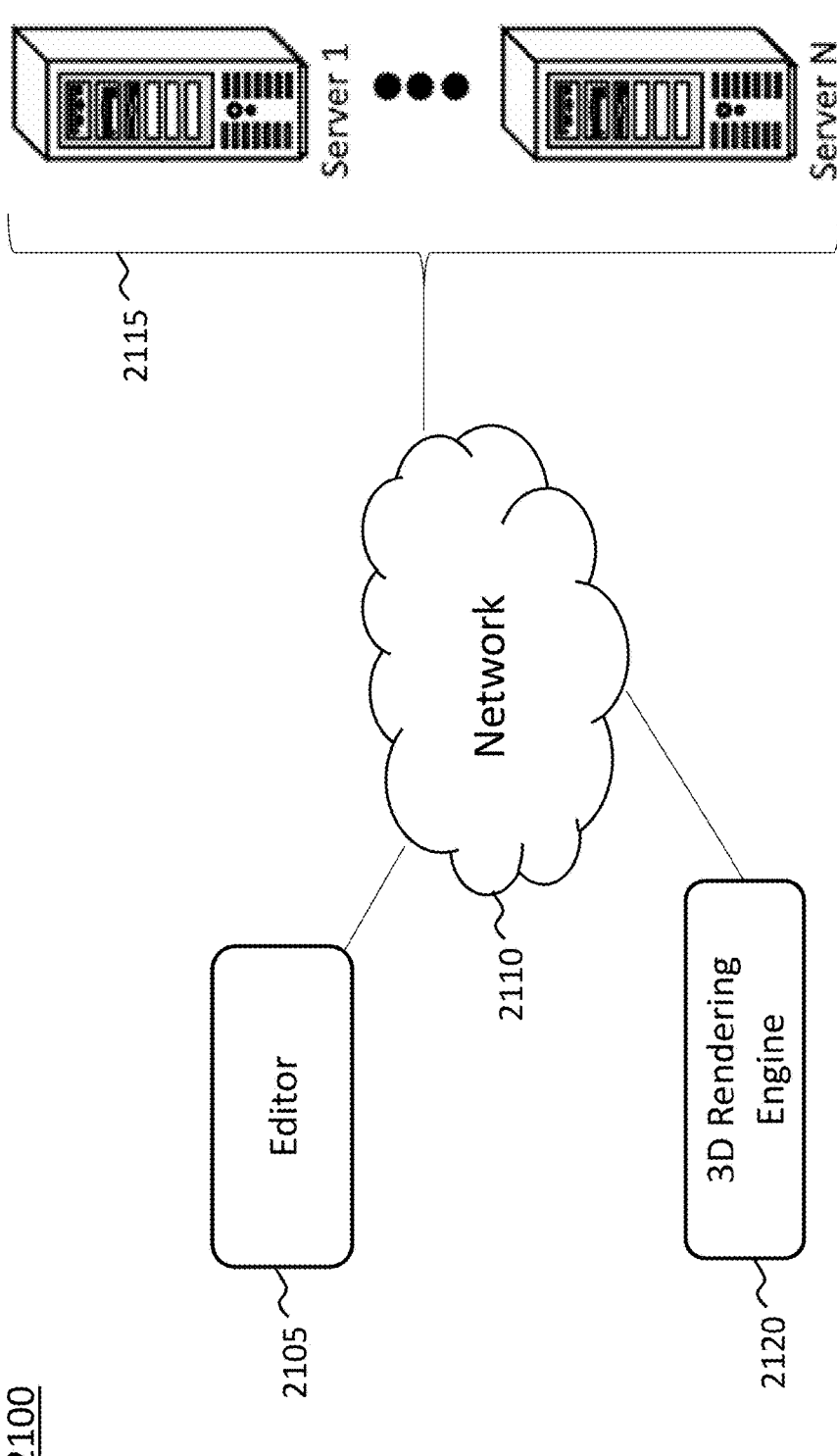
FIG. 21 is a block diagram of an example of a system having an editor, 3D engine, and server(s) for replacing a 3D container in a 3D scene with a replacement 3D object, in accordance with some embodiments of the disclosure.

At block 106, the control circuitry 1920 and/or 1928 may render the replacement 3D object into the 3D scene at the time of rendering the 3D scene. This rendering of the 3D scene with the replacement 3D object is also referred to herein as a second rendering, where the first rendering is the rendering of the 3D scene with the container. The control circuitry 1920 and/or 1928 may use a 3D rendering engine, as depicted in FIG. 21, to perform such rendering. At the time of rendering, the 3D engine may render the replacement 3D object without having to perform any enhancement since any enhancement needed may already be included in the 3D scene. Such enhancements to the replacement 3D object that have already been made part of the 3D scene may include enhancing the texture and other components of the replacement 3D object such that it fits in with the environment in which the replacement 3D object is to be placed. These enhancements that may be done prior to rendering may include, but are not limited to, applying textures (including light reflection information and animation), applying audio arranged at clearly defined locations, using a set of light sources arranged at clearly defined locations, each associated with emission parameters (direction, color temperature, intensity, diffusion), using cameras for that scene (location, orientation, field of view), and application of filters (chroma adjustment, noise addition, brightness, antialiasing). All such rendering enhancements allow the replacement 3D object to blend into the scene making it appear as if the replacement 3D object, which was inserted into the 3D scene after its original creation, was there from the outset or from the time of creation of the 3D scene and not something that was overlayed or inserted. Such enhancement provides a high-quality look and feel of the replacement 3D object in a positive light and make it part of the 3D scene.

FIG. 2 is a flowchart of a process 200 of inserting a replacement 3D object in place of a 3D container in a 3D scene, in accordance with some embodiments of the disclosure.

The process 200 may be implemented, in whole or in part, by systems or devices such as those shown in FIGS. 19-20. One or more actions of the process 200 may be incorporated into or combined with one or more actions of any other process or embodiments described herein. The process 100 may be saved to a memory or storage (e.g., any one of those depicted in FIGS. 19-20) as one or more instructions or routines that may be executed by a corresponding device or system to implement the method 200.

In some embodiments, at block 205, a 3D scene is generated on an electronic device. Some examples of such 3D scenes are depicted in FIGS. 5-8, 11, and block 101 of FIG. 1. The 3D scene may be generated by an editor, such as the editor depicted in FIG. 21, and be rendered as any type of video or interactive program, such a s a video game or an XR environment.

At block 210, a 3D container may be generated in the 3D scene by the scene designer using a video editor. The 3D container, as described earlier, is a template which includes attributes and rules that are to be adhered to when replacing it with a replacement 3D object. The 3D container is a virtual outline that defines a location and space in the 3D scene where the replacement 3D object may be inserted.

At block 215, optionally, in some embodiments, as depicted in FIG. 4, the 3D container is tagged as replaceable to signal that it presents a product placement opportunity and can be replaced by a replacement 3D object, which may be a commercial advertisement for a product or any other type of replacement 3D object. To signal the product or object replacement opportunity, a scene designer, using the editor, may generate one or more 3D containers in the 3D scene and tag them as replaceable.

In some embodiments, tagging a 3D container to signal that it is replaceable may be optional and the mere existence of a 3D container may be indicative that the 3D container is replaceable.

As further depicted in FIG. 4, at blocks 410 and 410, a 3D scene may include a 3D container that is tagged or may include a 3D container that is not tagged but by its existence alone its indicative that it is replaceable.

At block 220, a request to render a 3D scene may be received. As such, the video program resulting of the rendering of the 3D scene, the 3D scene being generated at block 205, may be displayed at block 220.

At block 225, attributes and rules associated with the displayed and rendered 3D scene may be obtained. These attributes may include, for example, dimensions, coordinates, size, location in the 3D scene, product category of the replacement 3D object, or any other attribute, such as the attributes listed in FIG. 9, that the scene designer associates with the 3D container. The scene designer may also include rules associated with the 3D container that are to be followed when selecting a replacement 3D object can be inserted in the place of the 3D container. Some exemplary rules are depicted in FIG. 10. These rules restrict what can and cannot be inserted and may be based on geography where the video program resulting of the rendering of the 3D scene is to be displayed or may be based on other factors such as pricing or the replacement 3D object, a bid submitted by a vendor to display their product as the replacement 3D object, and parental guidance concerns.

The attributes may also include scene level filters associated with the 3D container that are to be used as a template for the replacement 3D object.

Rule associated with the 3D container may also be obtained. In some embodiments the rules may prevent certain competitor products to be used as replacement 3D objects. For example, if a current existing object within the 3D container is a soda for Coca-Cola™, the rule may prevent their competitors, such as Pepsi™, to display their Pepsi soda can as a replacement 3D object. In such scenarios, the rule may identify which products or competitor products cannot be used as replacement 3D objects. In another example, in a previous 3D scene, a 3D container may include a Pepsi which may have been placed in the 3D container based on a previous bid being won by a vendor. In a new 3D scene that is subsequent to the previous 3D scene, a new bid for a product placement opportunity may take place which is linked to the previous one. Since Pepsi won the previous bid, the rules may state that the only allowed replacement 3D object can be another Pepsi can or Pepsi related product or a default object in that scene, such as a generic soda can or empty space. As such, the rules may prevent another brand from being represented since Pepsi had won the previous bid.

In some embodiments the rules may prevent replacement objects of certain types of products that are not family friendly, suited for prime-time slot, or not appropriate for children to be displayed. For example, if the 3D scene is part of a cartoon that is displayed for children under the age of 12, then any products that are not suitable for children, such as alcohol, sex related products and other others that are typically suited for adults, may be prevented from being used as replacement 3D objects for any other containers of the 3D scene.

In some embodiments the rules may require that replacement 3D objects belong to a same product category or family of products as an existing product that is displayed within a 3D container in the 3D scene. For example, if 3D container in a 3D scene includes a coffee machine, that accepted replacement 3D objects that are in the same family of products, such as an espresso machine, another type of coffee maker, a coffee grinder, or other coffee or tea related products may be acceptable.

In some embodiments the rules may require the control or processing circuitry, such as the control or processing circuitry shown in FIGS. 19-20, to select replacement 3D objects based on their appropriateness to the environment where they will be displayed. For example, in FIGS. 8A and 8B, the 3D container in the 3D scene is on top of a kitchen countertop. Accordingly, suitable replacement 3D objects may be those objects that are suitable for a kitchen countertop environment. These replacement 3D objects may include any type of food that is typically found on top of a kitchen countertop, utensils, cookware, pots or pans, baking equipment, a juice machine, a meat processor, or any other replacement 3D object that is typically associated with being used in a kitchen. some examples of replacement 3D objects that are not appropriate to the kitchen countertop environment may include car parts, weightlifting equipment, display a large animal (such as a cat or dog) or the like that is typically not found on a kitchen countertop.

These are other types of rules that the designer has inputted may be obtained such that only replacement 3D products that satisfy the inputted rules may be selected. In some embodiments, the rules may be inputted by the designer of this 3D scene, and in another embodiment, the artificial intelligence software may determine who is consuming the 3D scene, such as based on the person who logged in and their profile, and accordingly suggest which products can and cannot be uses as replacement 3D objects. As such, the replacement 3D objects may be selected based on the targeted audience.

In one embodiment, at block 240, attributes and rules associated with the 3D container may be transmitted to one or more object servers. In response to transmitting the attributes and rules associated with the 3D container to one or more object servers, the object servers may transmit back one or more replacement 3D. The received replacement 3D objects may be analyzed to determine if they meet the criteria of set by the attributes and rules on the 3D container.

In some embodiments, as depicted at block 245, more than one object server that belongs to separate entities, such as ad agencies, may submit a bid to place their replacement 3D object in place of the 3D container. The bid may include price, information, and other information as requested by the control circuitry 1920 and/or 1928 to entertain the bid.

In some embodiments, the control circuitry 1920 and/or 1928 may receive bids for different time slots in the 3D scene. For example, if a 3D container spans over a certain period of time in the 3D scene, such as it spas over a first portion and a second portion, then the control circuitry 1920 and/or 1928 may place a first replaceable 3D object and it the first portion of the 3D scene that includes the 3D container and a second replaceable 3D object in the second portion of the 3D scene that includes the 3D container. Accordingly, the control circuitry 1920 and/or 1928 may place different replacement 3D objects in different frames of the 3D scene in which the 3D container is generated thereby leveraging their advertisement, white label, or product placement opportunity space to maximize it as desired.

At block 245, a replacement 3D object that satisfies the attributes and rule (or bids) may be selected and rendered at block 255. The rendering may be in real-time as the 3D scene is being consumed, i.e., the replacement 3D object may be inserted into the 3D scene at the time of rendering the 3D scene using a 3D rendering engine. The rendering of the 3D scene with the replacement 3D object is also referred to herein as a second rendering, where the first rendering is the rendering of the 3D scene with the container. In some embodiments, the final cut or rendering may not come from the 3D rendering engine itself but from programs such as Final Cut™, Adobe Premiere™ or DaVinci Resolve™ to replace the 3D container with the replacement 3D object.

Figure 5:
FIG. 5 is an example of 3D containers in a 3D scene, where the 3D containers include existing objects and null spaces, in accordance with some embodiments of the disclosure.

FIG. 5 is an example of 3D containers in a 3D scene, where the 3D containers include existing objects and null spaces, in accordance with some embodiments of the disclosure. The 3D containers described herein may be included in 3D scene data generated by an editor, such as the editor depicted in FIG. 21. Before rendering, the 3D rendering engine (e.g., the 3D rendering engine depicted in FIG. 21 or any other suitable entity) may replace the 3D container with a replacement 3D object (e.g., by inserting the replacement 3D object in the scene data in place of the 3D container). Replacement may occur at any suitable time prior to rendering, depending on the embodiment. In some instances, replacement.

As depicted in FIG. 5, there are three 3D containers in the 3D scene that depicts a street in a downtown of a city having tall buildings. In this embodiment, the 3D container 510 is on the side of a building that does not include an existing product within the 3D container. This may be used as a product placement opportunity, such as used as a billboard sign, for displaying any replacement 3D object. The attributes for this 3D container may indicate the length width and depth of a billboard sign that may be placed in 3D container 510. The rules may also identify what types of billboards may be placed in 3D container 510. For example, the rules and attributes may allow a movie poster for an upcoming movie to be placed in 3D container 510. In another example, the rules and attributes of 3D container 510 may allow an advertisement of a product.

Another 3D container 520 in this 3D scene includes an existing object, which is a car. In this embodiment, based on the attributes and rules, a car manufacturer may replace the 3D container with the existing car with a car that they make. For example, Tesla™, an electric car manufacturer, may replace 3D container 520 (which has an existing car) with a Tesla electric car that more prominently shows a Tesla symbol.

Another 3D container 530 in this 3D scene includes a sign that hangs of a light pole. This may also be used as a product placement opportunity, such as used as a billboard sign, for displaying any replacement 3D object.

Figure 6:
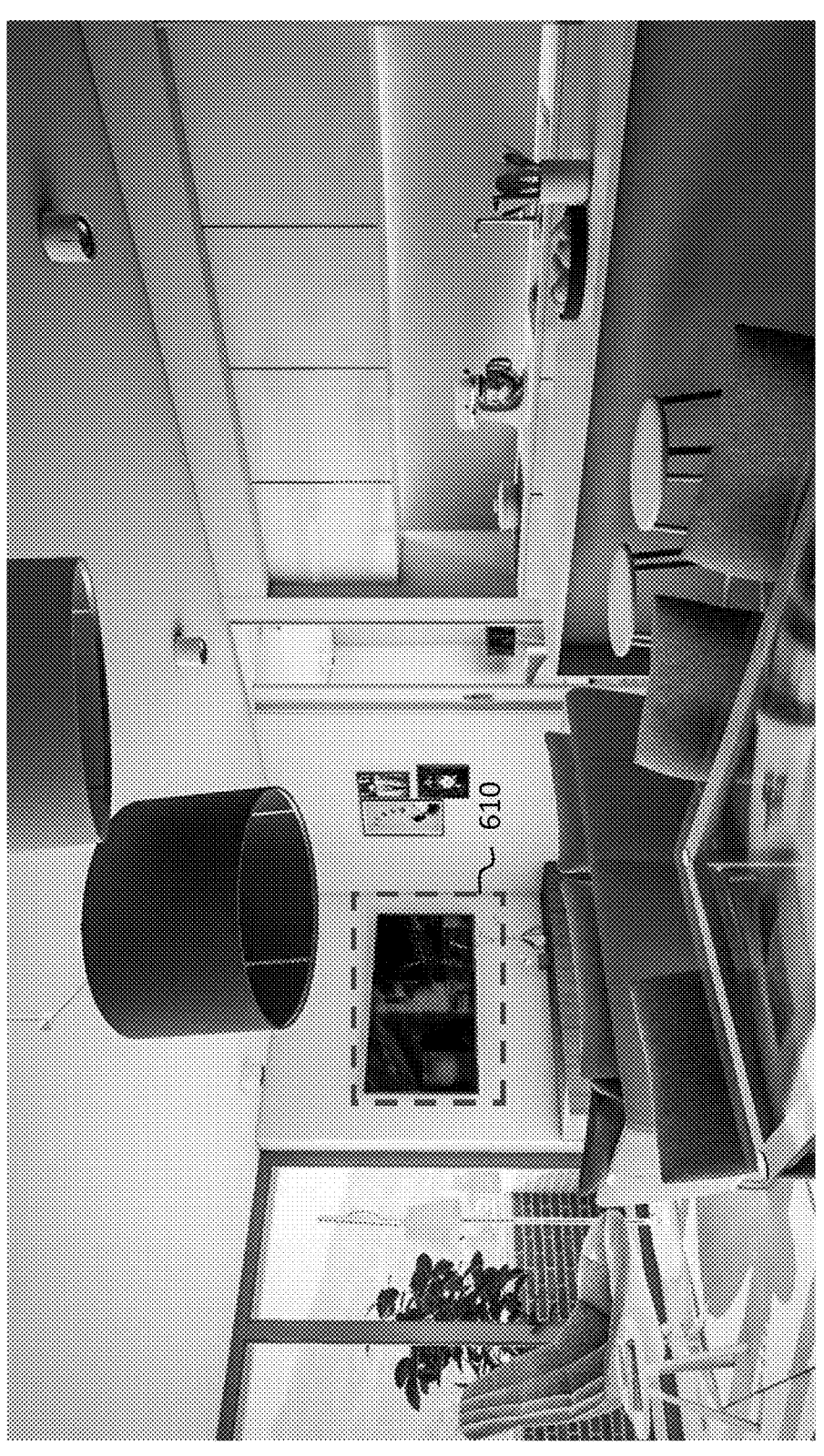
FIG. 6 is an example of 3D containers with an existing object in a 3D scene, in accordance with some embodiments of the disclosure.

FIG. 6 is an example of 3D containers with an existing object in a 3D scene, in accordance with some embodiments of the disclosure.

As depicted in FIG. 6, 3D containers 610 in located in a 3D scene that depicts an area inside a home. In this embodiment, the 3D container 610 includes a television display screen that is mounted on a wall. This may be used as a product placement opportunity, such as to display a replacement 3D object on the television screen. In accordance with attributes and rules associated with the 3D container, a product, or any other type of acceptable replacement 3D object may be displayed. The attributes may require that replacement 3D object fit within the confines of the television display such that is looks like the replacement 3D object is being displayed on the television set. Accordingly, a good replacement candidate could be a complex replacement 3D object with an animated texture and sound generation such as a new TV set with a special program playing or an in-wall aquarium or a simple object with a simple texture such as a large poster.

Figure 7:
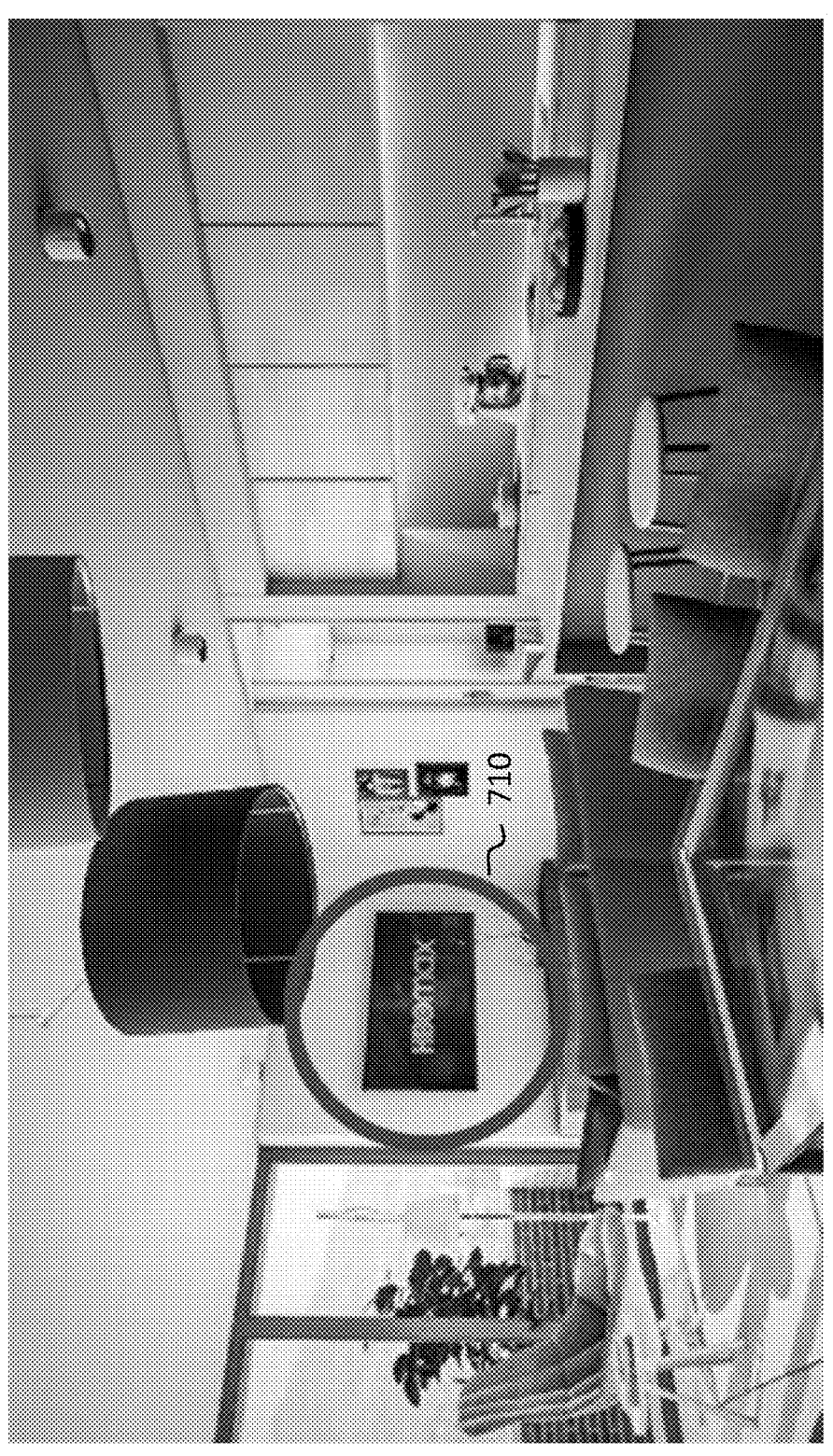
FIG. 7 is an example of replacing a 3D container (white label product) with a replacement 3D object (a branded product), in accordance with some embodiments of the disclosure.

FIG. 7 is an example of replacing a 3D container (white label product) with a replacement 3D object (a branded product), in accordance with some embodiments of the disclosure. In this figure, a 3D canister, which is a white label TV, has been replaced by the branded HBO Max TV set.

In this embodiment, for example, the rules may allow only certain type of images and branded o assets to be used as replacement 3D objects to replace the 3D container. For example, the rules may allow that HBO Max™ or Disney™ be the only companies allowed to display their products in this space.

Figures 8A, 8B:
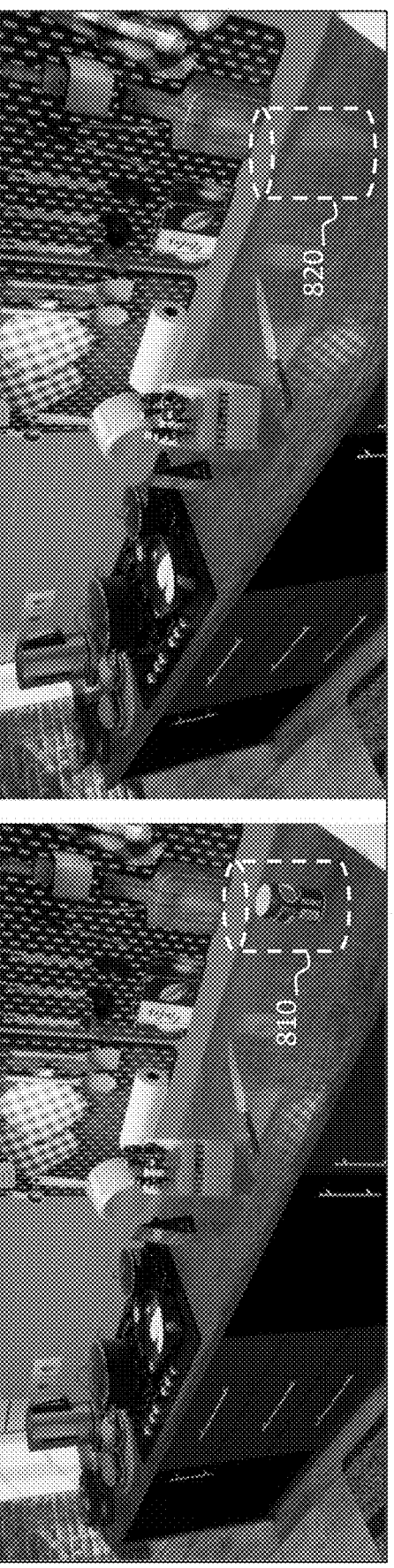
FIG. 8A is an example where that container is filled with a replacement object at rendering time, in accordance with some embodiments of the disclosure.
FIG. 8B is an example of an empty 3D container identifying a product placement opportunity, in accordance with some embodiments of the disclosure.

FIG. 8B is an example of an empty 3D container 820 identifying a product placement opportunity located on top of a kitchen countertop in accordance with some embodiments of the disclosure and FIG. 8A is an example where that container is filled with a replacement object at rendering time, that object being a Pepsi branded soda can 810.

In some embodiments, the attributes of container 820 may identify the location, size, genre or product category (such as a type of soda) that may be used as a template for selecting a replacement 3D object.

Figure 9:
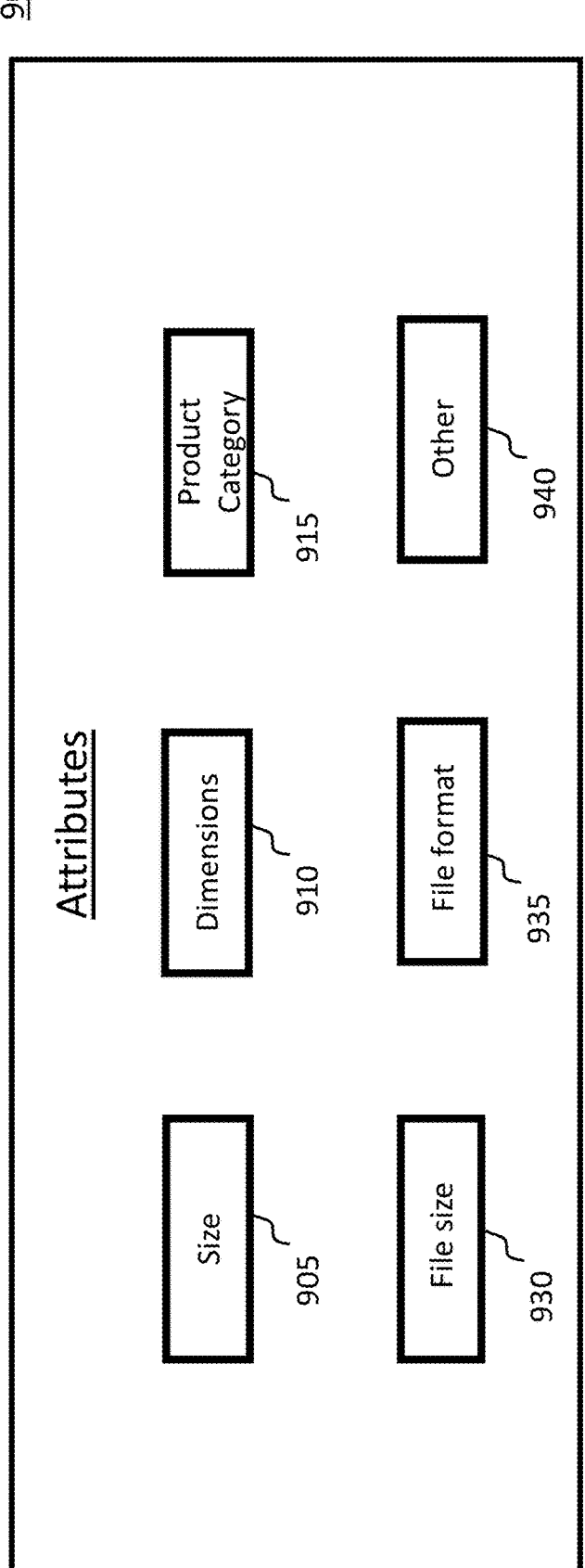
FIG. 9 is a block diagram of examples of attributes of a 3D container, in accordance with some embodiments of the disclosure.

FIG. 9 is a block diagram of examples of attributes of a 3D container, in accordance with some embodiments of the disclosure. Some examples of attributes include, size, dimensions, product category, lighting, reflection, file size, and file format. Although a few examples have been listed, the embodiments are not so limited, and any other type of attribute may be selected by the designer of the 3D container. In order to ensure that product placement opportunities are clearly identified, the attributes of the 3D container, which may be indicated by metadata, indicate which types of replaceable 3D objects are acceptable and which objects in the 3D scene are replaceable and whose texture can be replaced. In some embodiments, the embodiments include adding a qualifier so that nonequivalent objects cannot be interchangeable and used as replacement 3D objects to replace a 3D container.

File size 930 and file format 935 may also be listed as an attribute of the 3D container. These attributes may require the replacement 3D object to be within a particular file size and be in a certain file format such that it can be used by the 3D rendering engine to render in place of the 3D container.

FIG. 10 is a block diagram of examples of rules associated with the 3D container, in accordance with some embodiments of the disclosure. These rules restrict what can and cannot be inserted as replacement 3D objects for the 3D container. In some embodiments, the rules may be based on geography where the 3D scene is to be displayed. For example, if the 3D scene is being displayed in India, then only those products that are sold in the Indian subcontinent may be allowed to be used as replacement 3D objects. In another example, if the 3D scene is being displayed in Saudi Arabia, where alcoholic products are not allowed (as depicted in Rule A), then the rules made restrict replacement 3D objects to be nonalcoholic or to those replacement 3D objects that are culturally acceptable in the country of Saudi Arabia.

In some embodiments, as depicted in Rule B, replacement 3D objects may be restricted to those objects that are appropriate for children under a certain age. In some embodiments, depending on the nature of the 3D scene, such as a children base program, an artificial intelligence algorithm may automatically generate the rule that any replacement 3D object cannot be targeted for above the age limit for the child that is consuming the 3D scene.

In some embodiments, as listed in rule C, the replacement 3D object may not be a competitor product. For example, if the 3D scene relates to a first product that is sponsored by a company, then such company may not want the replacement 3D product to be of their competitor's product depicted somewhere else in the program.

In some embodiments, as listed in Rule D, pricing restrictions may be placed on the type of replacement 3D object. As depicted in this example, the replacement 3D object may not depict a product the price of $50.

In some embodiments, as listed in Rule E, the rule may require that any replacement 3D object that is to be used for replacing the 3D container shall be offered for sale within a predetermined distance where the 3D scene or media asset is to be consumed. By doing so, the control circuitry 1920 and/or 1928 may ensure that the products are within a vicinity of where the person consuming the 3D scene are located such that they can visit the store and purchase it.

In some embodiments, rating of a product that is to be used as a replacement 3D object may need to be above a certain consumer rating for the control circuitry 1920 and/or 1928 to accept it as a replacement 3D object. By doing so, the control circuitry 1920 and/or 1928 may ensure that only high-quality products that have a higher consumer rating our used as replacement 3D objects and prevent lower rated replacement 3D objects to be used in the 3D scene thereby reducing the value or reputation of the 3D scene.

The above-mentioned rules are exemplary, and the embodiments are not so limited. Any other type of rule that is desired by the 3D scene creator or automatically input it based on execution of an artificial intelligence algorithm are also contemplated.

Figure 11:
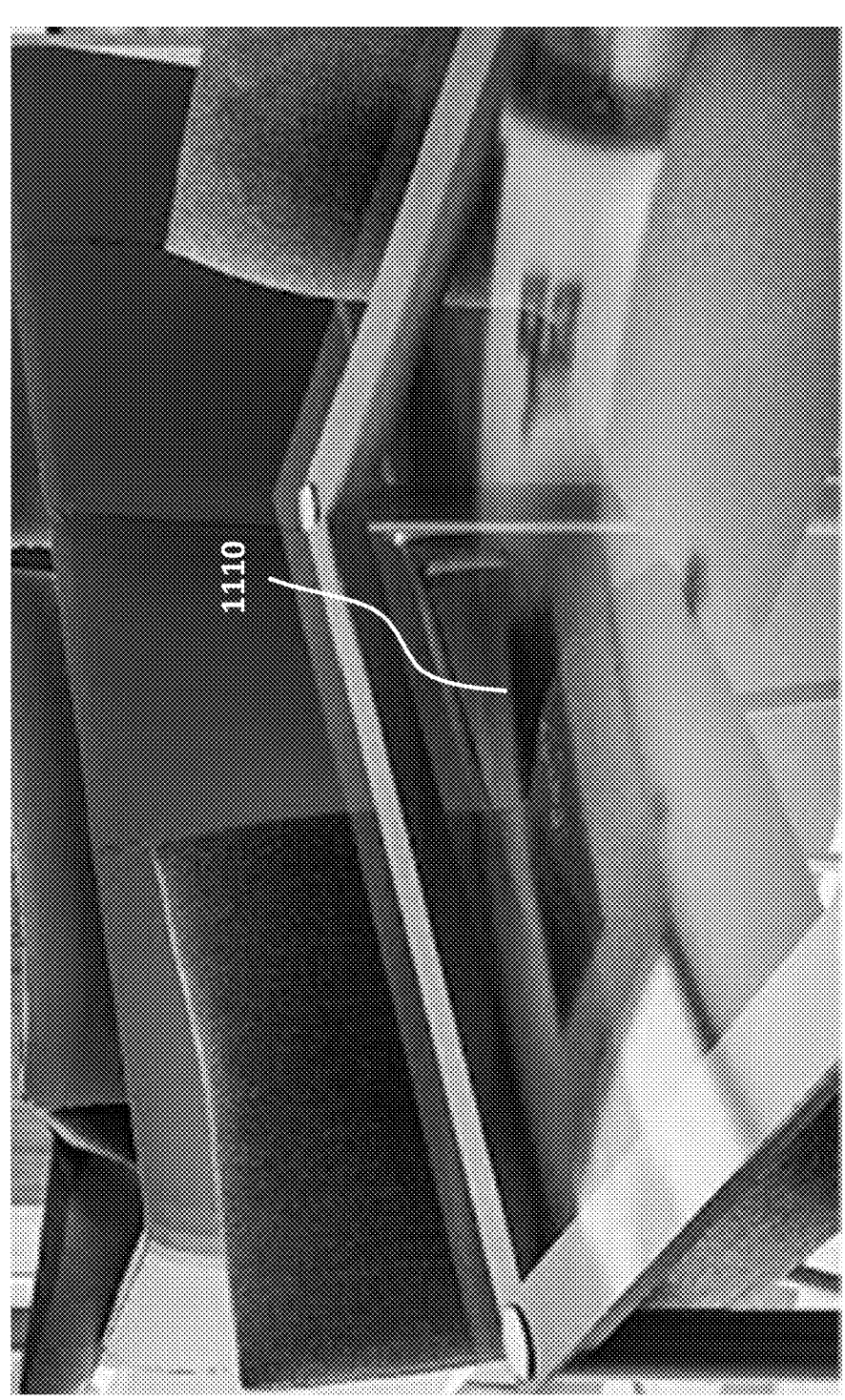
FIG. 11 is an example of a rendering engine automatically replacing a reflection of an object within a 3D scene, in accordance with some embodiments of the disclosure.

FIG. 11 is an example of a rendering engine automatically replacing a reflection of an object within a 3D scene, in accordance with some embodiments of the disclosure. Once a replacement 3D object is inserted in place of a 3D container, there is no need to manually edit any reflection of the replacement 3D object that may occur. The rendering engine will do it automatically as it has an overall awareness of all objects in the scene, including the replacement 3D object. As depicted in the example of FIG. 11, a detail of FIG. 7 (as highlighted in red circle for the sake of description), when the scene of FIG. 6 is rendered using the HBO max replacement TV set 710 (replacement 3D object) instead of the TV set that is off in FIG. 6 (i.e. the original white label object), the rendering engine automatically recomputes all the reflections and shadows in the scene and is able to display the reflection 1110 of the new TV set on the glass table correctly without any manual intervention.

FIG. 12 is an example of selecting a replacement 3D object that conforms to the required attributes of the 3D container, in accordance with some embodiments of the disclosure. As described above in blocks 105 of FIG. 1 or block 250 of FIG. 2, one of the attributes that may be required of the replacement 3D object may be that the replacement 3D object fit within an envelope of the 3D container. FIG. 14 provides an example of where a first replacement 3D object 1410 does not fit within the envelope of 3D container 1400. Accordingly, the control circuitry 1920 and/or 1928 rejects the oversized spring water bottle 1410 since it does not adhere to the size attribute. In another embodiment, a second replacement 3D object 1420 fits within the envelope of the 3D container and as such is selected for rendering into the 3D scene.

Figure 15:
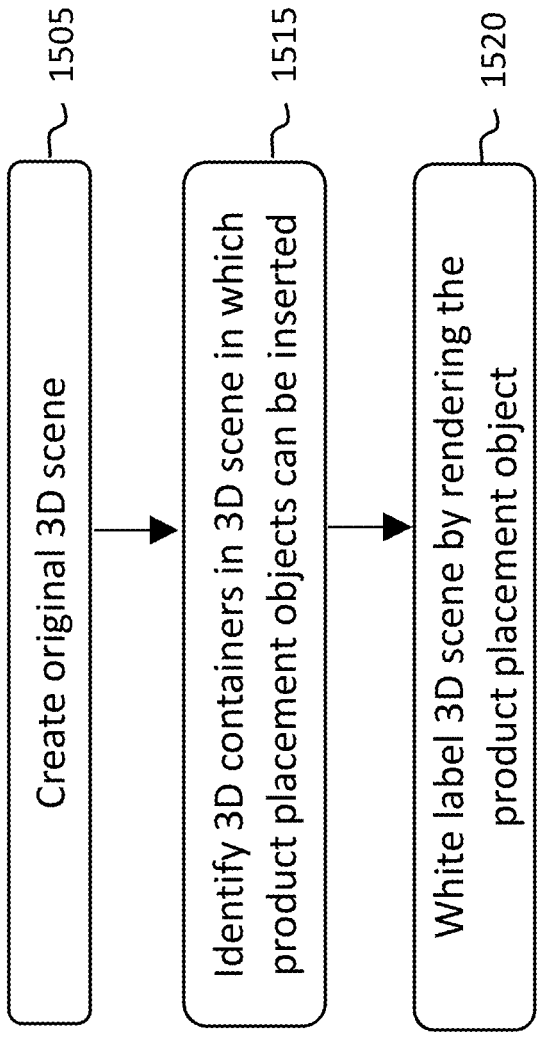
FIG. 15 is a flowchart of a process of white labeling a 3D scene, in accordance with some embodiments of the disclosure.

FIGS. 13 and 14 are exemplary illustrations of how a container with a replaceable tag appended to it would look in glTF format FIG. 15 is based on a JSON structure for a scene description where the 3D scene is described based on its assets, scenes, nodes, materials, textures, images, buffer views, samplers, and buffers.

FIG. 15 is a flowchart of a process of white labeling a 3D scene, in accordance with some embodiments of the disclosure.

The process 1500 may be implemented, in whole or in part, by systems or devices such as those shown in FIGS. 19-20. One or more actions of the process 100 may be incorporated into or combined with one or more actions of any other process or embodiments described herein. The process 1500 may be saved to a memory or storage (e.g., any one of those depicted in FIGS. 19-20) as one or more instructions or routines that may be executed by a corresponding device or system to implement the method 1500.

The process begins at block 1505 where an original 3D scene, i.e., a white label scene, is created. The white label scene is the scene rendered without any of the replaceable objects or containers replaced. It's basically what comes out of the creative process. An example of the 3D scene is depicted in block 101 of FIG. 1 and in FIGS. 5-8B and 11.

At block 1515, the 3D container in which product placement object can be inserted is identified. Once the 3D container is identified, the 3D scene is white labeled at block 1520, which means that a replacement 3D object, referred to in this embodiment as product placement object, is inserted in the 3D scene in place of the identified 3D container. The inserted replacement 3D object is a product that is available in the market.

Figure 16:
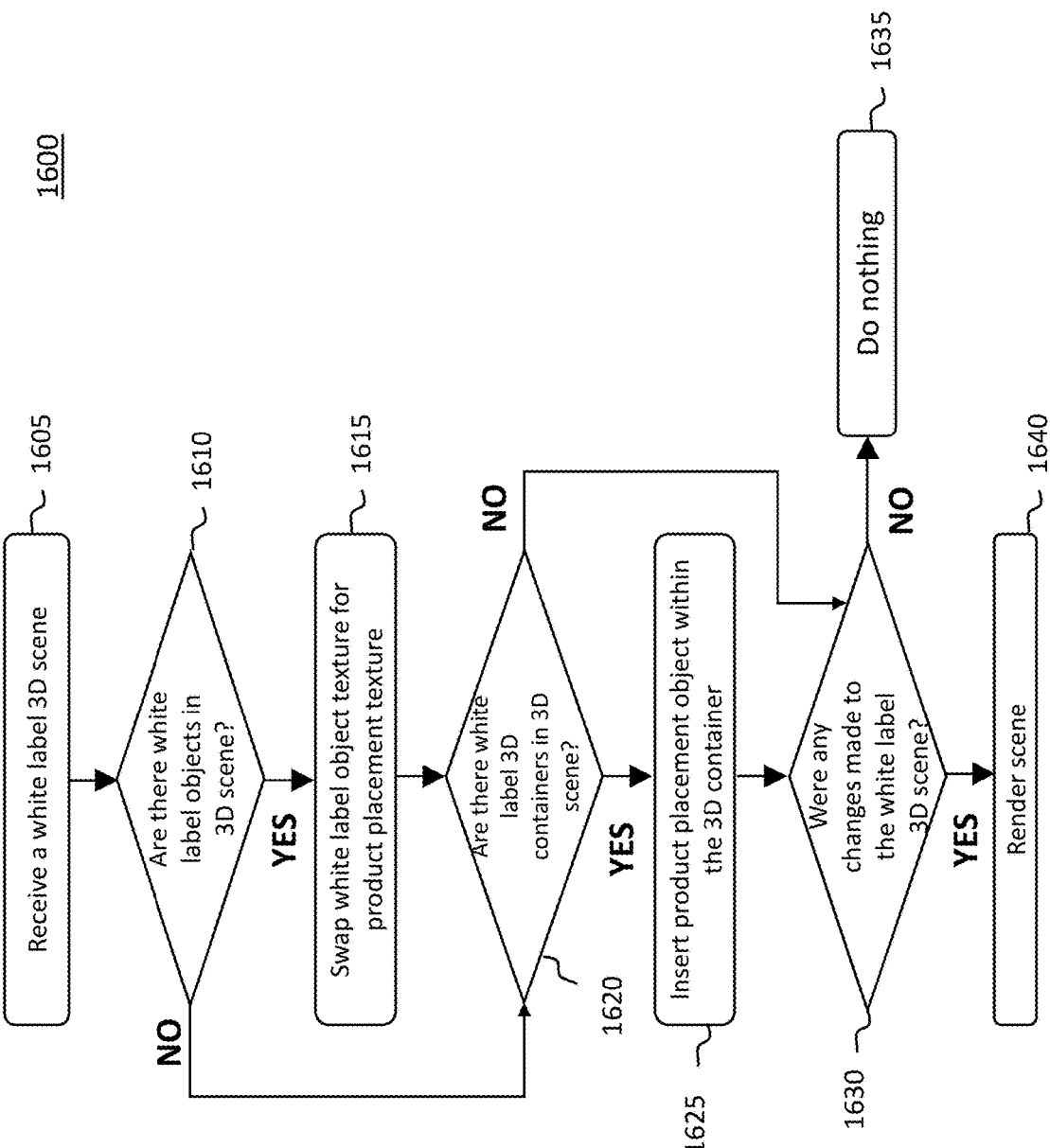
FIG. 16 is a flowchart of a process of white labeling a 3D scene, in accordance with some embodiments of the disclosure.

FIG. 16 is a flowchart of a process 1600 of white labeling a 3D scene, in accordance with some embodiments of the disclosure.

The process 1600 may be implemented, in whole or in part, by systems or devices such as those shown in FIGS. 19-20. One or more actions of the process 1600 may be incorporated into or combined with one or more actions of any other process or embodiments described herein. The process 1600 may be saved to a memory or storage (e.g., any one of those depicted in FIGS. 19-20) as one or more instructions or routines that may be executed by a corresponding device or system to implement the method 1600.

In some embodiments, at block 1605, a white label 3D scene is received by an electronic device. This may be a white label scene that is in the process of being built or designed by a designer. As referred to in this figure, white label 3D scene is also referred to as 3D scene, white label object is also referred to as an existing object within the 3D scene or within the 3D container, and white label 3D container is also referred to as 3D container.

At block 1610, a determination is made whether there are any white label objects in the 3D scene period. In some embodiments, white label objects are objects that are identified as replaceable objects in the 3D scene. The while label object is an existing object within a 3D container.

If a determination is made at block 1610 that there does exist a white label object in the 3D scene, then at block 1615, the white label object texture may be swapped for product placement texture. The process then moves to block 1620.

If a determination is made at block 1610 that there does not exist a white label object in the 3D scene, then the process moves from block 1610 to 1620, where another determination is made as to whether there are white label containers in the 3D scene. As mentioned earlier a 3D container defines a location and space in the 3D scene where a replacement 3D object can be inserted. The 3D container, in some embodiments, acts as a template whose metadata includes attributes and rules that are to be adhered to by the replacement 3D object, also referred to as the white label product placement object in this figure.

If a determination is made at block 1620 that white label containers exist in the 3D scene, then at block 1625, the control circuitry 1920 and/or 1928 inserts the product placement object in place of the 3D container.

If a determination is made at block 1620 that white label containers does not exist in the 3D scene, then at block 1630, the control circuitry 1920 and/or 1928 determines whether any changes were made to the white label 3D scene.

If no changes were made to the white label scene, then no changes are performed to the scene, as depicted at block 1635. However, if changes were made to the white label scene, then at block 1640, the 3D scene with the white label product placement texture is instead into the 3D scene.

Figure 17:
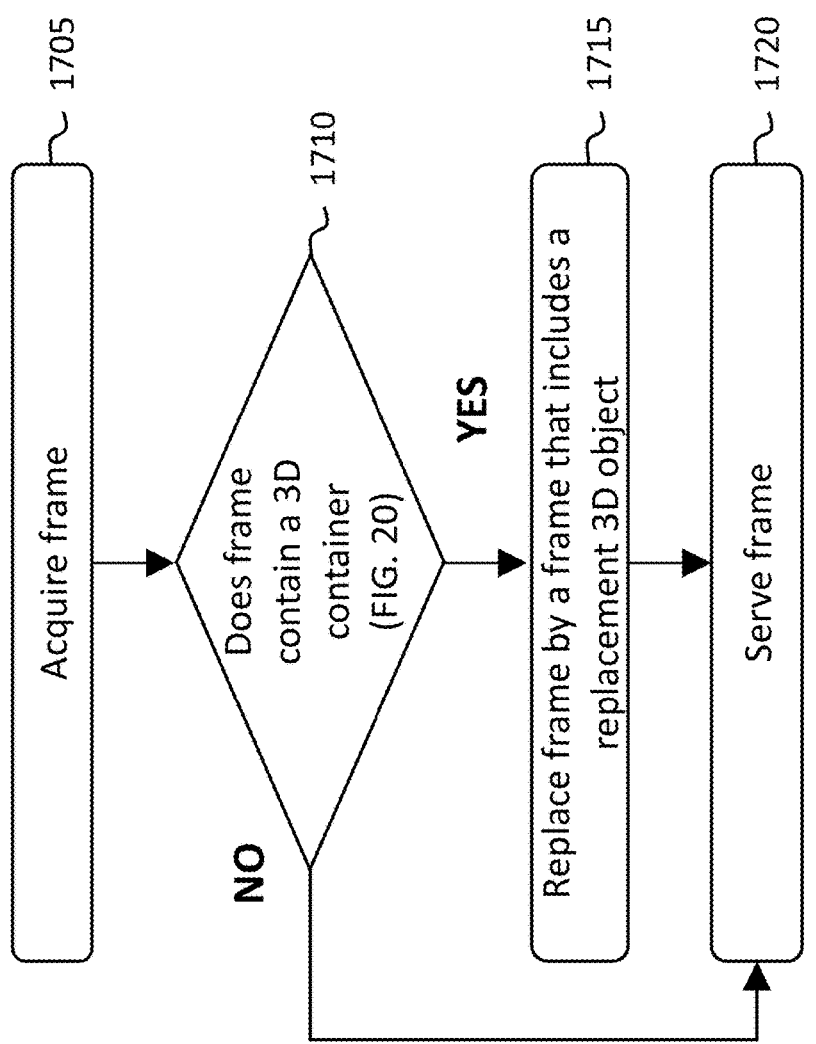
FIG. 17 is a flowchart of a process or pre-rendering a plurality of 3D scene by running the replacement rendering in advance. in accordance with some embodiments of the disclosure.

FIG. 17 is a flowchart of a process 1700 for pre-rendering a plurality of 3D scenes by running the replacement rendering of the replacement 3D object in advance of the rendering of the 3D scene with the replacement 3D object, in accordance with some embodiments of the disclosure.

The process 1700 may be implemented, in whole or in part, by systems or devices such as those shown in FIGS. 19-20. One or more actions of the process 1700 may be incorporated into or combined with one or more actions of any other process or embodiments described herein. The process 1700 may be saved to a memory or storage (e.g., any one of those depicted in FIGS. 19-20) as one or more instructions or routines that may be executed by a corresponding device or system to implement the method 1700.

At block 1705, a frame of the 3D scene is acquired. At block 1710, a determination is made whether the frame contains a 3D container. If a determination is made that the frame contains a 3D container, then at block 1715, the frame is replaced with another frame that includes a replacement 3D object, in place of the 3D container in the earlier frame prior to replacement, and the frame is served at block 1720.

If a determination is made at block 1710 that the frame does not contain a 3D container, then the frame is served as is and not replaced.

The process of FIG. 17 illustrates the case where the 3D scene is not rendered in real time, but a plurality of scenes is pre-rendered by running the replacement rendering in advance. When such pre-rendering is performed, i.e. by running the replacement rendering in advance, the process may result in any one of the following scenarios: 1) a main asset which is a video rendered with only white label objects (i.e., default objects if present in the 3D container or no objects if no object were present in the 3D contain at the outset), 2) a plurality of video segments for each segment in which an object was in the field of view of the camera and could be replaced, and 3) a set of markers to indicate that such object come into view in the main asset. Accordingly, to address the above-mentioned scenarios, when a program is streamed, the video segments in the white label program may be replaced by one of the pluralities of video pre-rendered video segments for each replacement opportunities identified by a marker.

Figure 18:
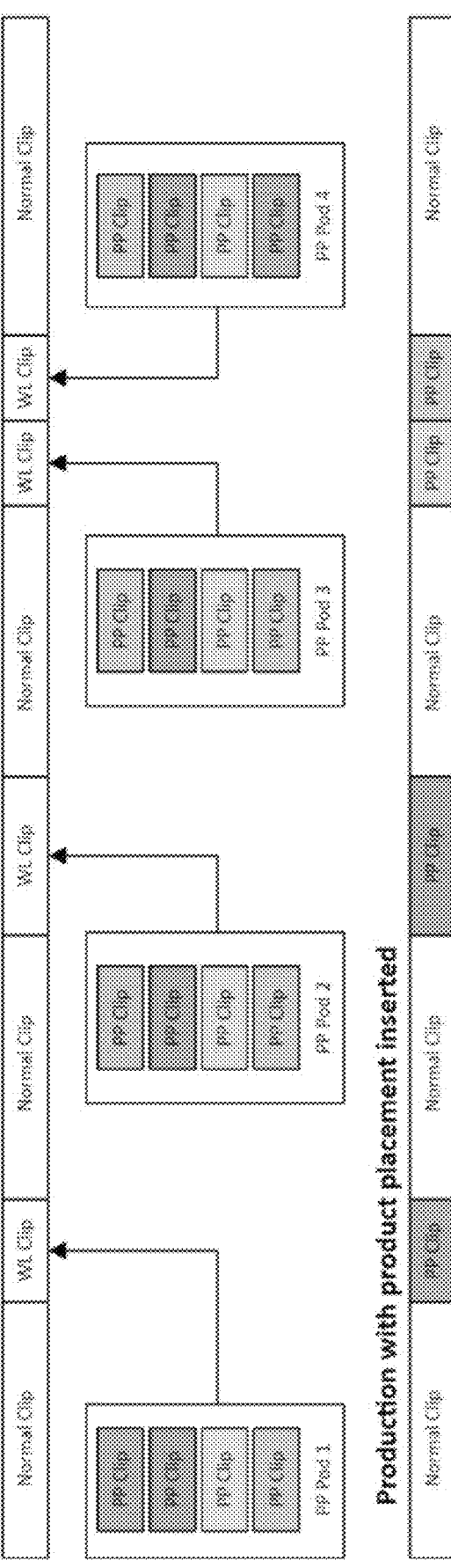
FIG. 18 is block diagram depicting video clips with replacement 3D object inserted in a media stream, in accordance with some embodiments of the disclosure.

FIG. 18 is block diagram depicting video clips with replacement 3D object inserted in a media stream, in accordance with some embodiments of the disclosure.

In some embodiments, the resulting clips that include the replacement 3D objects are assembled into a product placement database and signaling markers are inserted in the 3D scene (e.g., white label program) so that when the media is played, the origin (or the player) knows that it needs to insert (or request) a different stream.

During playback, the origin server (or the player) can either request a targeted replacement 3D object, such as a particular product, when a signaling marker is present or the origin server can pre-select the replacement 3D object clips to play when playback is started. The selection of what clip to play can be based on various targeting parameters and can also be based on bidding.

Each replacement 3D object clip insertion can be based off various targeting parameters that are dependent on the individual or group of individuals consuming the content. For example, User A may get the HBO Max™ and Heineken™ product placement while User B will get the Jack Daniels™ and Disney™ experience as replacement 3D Objects. The origin server or the player can make that determination in real time.

When processing power becomes available to render scenes in real time, the control circuitry 1920 and/or 1928 provides an additional level of flexibility as clips do not have to be re-rendered in advance. The origin server can just signal "I have an opportunity for a product placement of a bottle for this viewer/group of viewers" and traditional RTB can take place but instead of providing an image, video or text, the bidder provides a replacement 3D object of said bottle, then once a bid is won, the replacement 3D object is inserted in the scene, such as based on the clips insertion process described above and the player or origin server re-renders it to serve it to the viewer.

In another embodiment, the control circuitry 1920 and/or 1928 determines based on what user behavior user profile, or other user knowledge gathered based on machine learning techniques applied, that the user may prefer s certain type of product and clips of replacement 3D objects that include the user preferred products are used to target the user.

FIGS. 19 and 20 also describe example devices, systems, servers, and related hardware that may be used to implement processes, functions, and functionalities described at least in relation to FIGS. 1-18 and 21. FIG. 19 is a block diagram of an example system (e.g., implementing a rendering engine) for replacing a 3D container in a 3D scene with a replacement 3D object and FIG. 20 is a block diagram of an electronic device (e.g., implementing a 3D engine) used for rendering the replacement 3D object in the 3D scene, in accordance with some embodiments of the disclosure.

In some embodiments, FIGS. 19 and 20 may be used for generating a 3D scene, generating a 3D container in the 3D scene, identifying containers in the 3D scene, determining attributes and rules associated with the containers in the 3D scene, transmitting the attributes and rules to object servers, querying object servers, obtaining bids form object servers, analyzing the bids, determining whether the replacement 3D objects received adhere to the rules and attributes of the 3D container, selecting replacement 3D objects, storing the received replacement 3D objects in a repository or library, accessing the stored location of the replacement 3D objects, rendering the selected 3D replacement object in place of the 3D container, inserting a video clip having the replacement 3D object into a video stream, determining whether a 3D container includes an object of whether it is empty, ensuring that the replacement 3D object blends in with its surrounding where it is being placed and performing functions related to all other processes and features described herein.

In some embodiments, one or more parts of, or the entirety of system 1900, may be configured as a system implementing various features, processes, functionalities and components of FIGS. 1-18, and 21. Although FIG. 19 shows a certain number of components, in various examples, system 1900 may include fewer than the illustrated number of components and/or multiples of one or more of the illustrated number of components.

System 1900 is shown to include a computing device 1918, a server 1902 and a communication network 1914. It is understood that while a single instance of a component may be shown and described relative to FIG. 19, additional instances of the component may be employed. For example, server 1902 may include, or may be incorporated in, more than one server. Similarly, communication network 1914 may include, or may be incorporated in, more than one communication network. Server 1902 is shown communicatively coupled to computing device 1918 through communication network 1914. While not shown in FIG. 19, server 1902 may be directly communicatively coupled to computing device 1918, for example, in a system absent or bypassing communication network 1914.

Communication network 1914 may comprise one or more network systems, such as, without limitation, an internet, LAN, WIFI or other network systems suitable for audio processing applications. In some embodiments, system 1900 excludes server 1902, and functionality that would otherwise be implemented by server 1902 is instead implemented by other components of system 1900, such as one or more components of communication network 1914. In still other embodiments, server 1902 works in conjunction with one or more components of communication network 1914 to implement certain functionality described herein in a distributed or cooperative manner. Similarly, in some embodiments, system 1900 excludes computing device 1918, and functionality that would otherwise be implemented by computing device 1918 is instead implemented by other components of system 1900, such as one or more components of communication network 1914 or server 1902 or a combination. In still other embodiments, computing device 1918 works in conjunction with one or more components of communication network 1914 or server 1902 to implement certain functionality described herein in a distributed or cooperative manner.

Computing device 1918 includes control circuitry 1928, display 1934 and input circuitry 1916. Control circuitry 1928 in turn includes transceiver circuitry 1962, storage 1938 and processing circuitry 1940. In some embodiments, computing device 1918 or control circuitry 1928 may be configured as electronic device 2000 of FIG. 20.

Server 1902 includes control circuitry 1920 and storage 1924. Each of storages 1924 and 1938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 1924, 1938 may be used to store various types of content (e.g., videos, 3D scenes, 3D containers, attributes and rules associated with the 3D containers in the 3D scene, bids form object servers, video clips having the replacement 3D objects, andAI and ML algorithms). Non-volatile memory may also be used (e.g., to launch a boot-up routine, launch an app, render an app, and other instructions). Cloud-based storage may be used to supplement storages 1924, 1938 or instead of storages 1924, 1938. In some embodiments, data relating to videos, 3D scenes, 3D containers, attributes and rules associated with the 3D containers in the 3D scene, bids form object servers, video clips having the replacement 3D objects, and AI and ML algorithms, and data relating to all other processes and features described herein, may be recorded and stored in one or more of storages 1912, 1938.

In some embodiments, control circuitries 1920 and/or 1928 executes instructions for an application stored in memory (e.g., storage 1924 and/or storage 1938). Specifically, control circuitries 1920 and/or 1928 may be instructed by the application to perform the functions discussed herein. In some implementations, any action performed by control circuitries 1920 and/or 1928 may be based on instructions received from the application. For example, the application may be implemented as software or a set of executable instructions that may be stored in storage 1924 and/or 1938 and executed by control circuitries 1920 and/or 1928. In some embodiments, the application may be a client/server application where only a client application resides on computing device 1918, and a server application resides on server 1902.

The application may be implemented using any suitable architecture. For example, it may be a stand-alone application wholly implemented on computing device 1918. In such an approach, instructions for the application are stored locally (e.g., in storage 1938), and data for use by the application is downloaded on a periodic basis (e.g., from an out-of-band feed, from an internet resource, or using another suitable approach). Control circuitry 1928 may retrieve instructions for the application from storage 1938 and process the instructions to perform the functionality described herein. Based on the processed instructions, control circuitry 1928 may determine a type of action to perform in response to input received from input circuitry 1916 or from communication network 1914. For example, in response to detecting a 3D container in a 3D scene, the control circuitry 1928 may obtain attributes and rules associated with the 3D container and use the attributes and rules as a template to query object servers for replacement 3D objects. It may also perform steps of processes described in FIGS. 1, 2, and 15-17.

In client/server-based embodiments, control circuitry 1928 may include communication circuitry suitable for communicating with an application server (e.g., server 1902) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1914). In another example of a client/server-based application, control circuitry 1928 runs a web browser that interprets web pages provided by a remote server (e.g., server 1902). For example, the remote server may store the instructions for the application in a storage device. The remote server may process the stored instructions using circuitry (e.g., control circuitry 1928) and/or generate displays. Computing device 1918 may receive the displays generated by the remote server and may display the content of the displays locally via display 1934. This way, the processing of the instructions is performed remotely (e.g., by server 1902) while the resulting displays, such as the display windows described elsewhere herein, are provided locally on computing device 1918. Computing device 1918 may receive inputs from the user via input circuitry 1916 and transmit those inputs to the remote server for processing and generating the corresponding displays. Alternatively, computing device 1918 may receive inputs from the user via input circuitry 1916 and process and display the received inputs locally, by control circuitry 1928 and display 1934, respectively.

Server 1902 and computing device 1918 may transmit and receive content and data such as it may transmit a template that includes attributes and rules associated with a 3D container which are required in a replacement 3D object and receive replacement 3D objects from object servers in response to a query that includes the attributes and rules requirements. Control circuitry 1920, 1928 may send and receive commands, requests, and other suitable data through communication network 1914 using transceiver circuitry 1960, 1962, respectively. Control circuitry 1920, 1928 may communicate directly with each other using transceiver circuits 1960, 1962, respectively, avoiding communication network 1914.

It is understood that computing device 1918 is not limited to the embodiments and methods shown and described herein. In nonlimiting examples, computing device 1918 may be an electronic device, a personal computer (PC), a laptop computer, a tablet computer, a WebTV box, a personal computer television (PC/TV), a PC media server, a PC media center, a handheld computer, a mobile telephone, a smartphone, a virtual, augmented, or mixed reality device, or a device that can perform function in the metaverse, or any other device, computing equipment, or wireless device, and/or combination of the same capable of replacing 3D containers with replacement 3D objects at the time of rendering.

Control circuitries 1920 and/or 1918 may be based on any suitable processing circuitry such as processing circuitry 1926 and/or 1940, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitries 1920 and/or control circuitry 1918 are configured for generating a 3D scene, generating a 3D container in the 3D scene, identifying containers in the 3D scene, determining attributes and rules associated with the 3D containers in the 3D scene, transmitting the attributes and rules to object servers, querying object servers, obtaining bids form object servers, analyzing the bids, determining whether the replacement 3D objects received adhere to the rules and attributes of the 3D container, selecting replacement 3D objects, storing the received replacement 3D objects in a repository or library, accessing the stored location of the replacement 3D objects, rendering the selected 3D replacement object in place of the 3D container, inserting a video clip having the replacement 3D object into a video stream, determining whether a 3D container includes an object of whether it is empty, ensuring that the replacement 3D object blends in with its surrounding where it is being placed and performing functions related to all other processes and features described herein.

Transmission of user input 1904 to computing device 1918 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 1916 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 1940 may receive input 1904 from input circuit 1916. Processing circuitry 1940 may convert or translate the received user input 1904 that may be in the form of voice input into a microphone, or movement or gestures to digital signals. In some embodiments, input circuit 1916 performs the translation to digital signals. In some embodiments, processing circuitry 1940 (or processing circuitry 1926, as the case may be) carries out disclosed processes and methods. For example, processing circuitry 1940 or processing circuitry 1926 may perform processes as described in FIGS. 1, 2, 15-17, respectively.

FIG. 20 is a block diagram of an electronic device used for consuming a content item, in accordance with some embodiments of the disclosure. In an embodiment, the equipment device 2000, is the same equipment device 1902 of FIG. 19. The equipment device 2000 may receive content and data via input/output (I/O) path 2002. The I/O path 2002 may provide audio content (e.g., such as in the speakers of an XR headset). The control circuitry 2004 may be used to send and receive commands, requests, and other suitable data using the I/O path 2002. The I/O path 2002 may connect the control circuitry 2004 (and specifically the processing circuitry 2006) to one or more communications paths or links (e.g., via a network interface), any one or more of which may be wired or wireless in nature. Messages and information described herein as being received by the equipment device 2000 may be received via such wired or wireless communication paths. I/O functions may be provided by one or more of these communications paths or intermediary nodes but are shown as a single path in FIG. 20 to avoid overcomplicating the drawing.

The control circuitry 2004 may be based on any suitable processing circuitry such as the processing circuitry 2006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 2004 may include communications circuitry suitable for generating a 3D scene, generating a 3D container in the 3D scene, identifying containers in the 3D scene, determining attributes and rules associated with the 3D containers in the 3D scene, transmitting the attributes and rules to object servers, querying object servers, obtaining bids form object servers, analyzing the bids, determining whether the replacement 3D objects received adhere to the rules and attributes of the 3D container, selecting replacement 3D objects, storing the received replacement 3D objects in a repository or library, accessing the stored location of the replacement 3D objects, rendering the selected 3D replacement object in place of the 3D container, inserting a video clip having the replacement 3D object into a video stream, determining whether a 3D container includes an object of whether it is empty, ensuring that the replacement 3D object blends in with its surrounding where it is being placed and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 2008 that is part of the control circuitry 2004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 2008 may be used to store various types of content, (e.g., videos, 3D scenes, 3D containers, attributes and rules associated with the 3D containers in the 3D scene, bids form object servers, video clips having the replacement 3D objects etc.)

Cloud-based storage, described in relation to FIG. 20, may be used to supplement the storage 2008 or instead of the storage 2008.

The control circuitry 2004 may include audio generating circuitry and tuning circuitry, such as one or more analog tuners, audio generation circuitry, filters or any other suitable tuning or audio circuits or combinations of such circuits. The control circuitry 2004 may also include scaler circuitry for upconverting and down converting content into the preferred output format of the electronic device 2000. The control circuitry 2004 may also include digital-to-analog converter circuitry and analog-to-digital converter circuitry for converting between digital and analog signals. The tuning and encoding circuitry may be used by the electronic device 2000 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 2008 is provided as a separate device from the electronic device 2000, the tuning and encoding circuitry (including multiple tuners) may be associated with the storage 2008.

The user may utter instructions to the control circuitry 2004, which are received by the microphone 2016. The microphone 2016 may be any microphone (or microphones) capable of detecting human speech. The microphone 2016 is connected to the processing circuitry 2006 to transmit detected voice commands and other speech thereto for processing. In some embodiments, voice assistants (e.g., Siri, Alexa, Google Home and similar such voice assistants) receive and process the voice commands and other speech.

The electronic device 2000 may include an interface 2010. The interface 2010 may be any suitable user interface, such as a remote control, mouse, trackball, keypad, keyboard, touchscreen, touchpad, stylus input, joystick, or other user input interfaces. A display 2012 may be provided as a stand-alone device or integrated with other elements of the electronic device 2000. For example, the display 2012 may be a touchscreen or touch-sensitive display. In such circumstances, the interface 2010 may be integrated with or combined with the microphone 2016. When the interface 2010 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 2010 may be HDTV-capable. In some embodiments, the display 2012 may be a 3D display. The speaker (or speakers) 2014 may be provided as integrated with other elements of electronic device 2000 or may be a stand-alone unit. In some embodiments, the display 2012 may be outputted through speaker 2014.

The equipment device 2000 of FIG. 20 can be implemented in system 1900 of FIG. 19 as primary equipment device 1902, but any other type of user equipment suitable for allowing communications between two separate user devices for performing the functions related to implementing machine learning (ML) and artificial intelligence (AI) algorithms, and all the functionalities discussed associated with the figures mentioned in this application.

FIG. 21 is a block diagram of an example of a system having an editor, 3D engine, and server(s) for replacing a 3D container in a 3D scene with a replacement 3D object, in accordance with some embodiments of the disclosure. The editor, in some embodiments, may be implemented by devices or systems, such as the system and device depicted in FIGS. 19-20, including the control or processing circuitry shown in FIGS. 19-20. The components of the system in FIG. 21, may also be used for implementing processes depicted in FIGS. 1, 2, and 15-17. Some of the components depicted in FIG. 21, such as the editor, may also be used to generate scene data representing a 3D scene (also referred to as generating a 3D scene) and generate a 3D container in the 3D scene as depicted in FIGS. 1, 3, 5-8, 11, and 12.

In some embodiments, the editor 2105 generates the 3D scene and the 3D container in the 3D scene. In other words, the scene designer may design the 3D scene, which includes the 3D container, using the editor. Later, at or before the time of rendering, the 3D rendering engine 2120 replaces the 3D container with the replacement 3D object. In some instances, the 3D rendering engine 2120 may pre-render the 3D scene with the 3D container included. Before a final rendering, the 3D container may be replaced with a replacement 3D object. The replacement 3D replacement object used at the final rendering may be obtained by the 3D rendering engine from any one of the object servers 2115 (also referred to as object servers). In some embodiments, the 3D replacement object used at the final rendering may be stored in a repository or library that may be accessed by the 3D rendering engine. Although control circuitry has been referred to in FIGS. 20 and 21, the client device may be configured to perform the same functions described above by the control circuitry.

It will be apparent to those of ordinary skill in the art that methods involved in the above-described embodiments may be embodied in a computer program product that includes a computer-usable and/or—readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating a 3D container;

generating scene data representing a 3D scene including the 3D container;

determining a request to render the scene data representing the 3D scene for an electronic device;

receiving an indication that the 3D container in the scene data representing the 3D scene is to be replaced;

in response to the indication, determining one or more object attributes indicated by the 3D container;

determining one or more product selection requirements for the 3D container based on targeting parameters associated with the request to render the scene data;

selecting, based on the one or more object attributes indicated by the 3D container and the one or more product selection requirements, a replacement 3D object; and rendering the scene data representing the 3D scene, including rendering the replacement 3D object in place of the 3D container.

2. The method of claim 1, wherein the object attributes indicated by the 3D container are dimensions, and in response to the indication, selecting the replacement 3D object that is within the indicated dimensions.

3. The method of claim 1, wherein the selecting the replacement object comprises:

transmitting the one or more object attributes to one or more object servers;

receiving a plurality of replacement 3D objects from the one or more object servers; and selecting one of the received 3D objects, from the plurality of 3D objects received, to render the selected replacement 3D object in place of the 3D container.

4. The method of claim 1, wherein selecting comprises analyzing the one or more object attributes to determine the replacement 3D object.

5. The method of claim 1, wherein an attribute, from the one of more attributes, is product category.

6. The method of claim 5, further comprising, selecting the replacement 3D object that is of of a same product category as the product category indicated by the 3D container.

7. The method of claim 1, wherein the scene data representing the 3D scene, at a time of generating the scene data representing the 3D scene based on the request to render the 3D scene, includes a plurality of 3D objects including the 3D container and one or more non-replacement 3D objects.

8. The method of claim 7, wherein the finished and rendered scene data representing the 3D scene includes the non-replacement 3D objects and the replacement 3D object.

9. The method of claim 1, wherein the 3D container is a template that includes the one or more object attributes requirement of the replacement 3D object.

10. The method of claim 1, wherein the 3D container includes metadata associated with the one or more object attributes.

11. The method of claim 1, wherein the one or more object attributes indicated by the 3D container is a rule for selecting the replacement 3D object.

12. The method of claim 11, wherein the rule indicates that the replacement 3D object must be an object that is socially acceptable in a country where the finished and rendered scene data representing the 3D scene is to be displayed.

13. The method of claim 1, further comprising:

monitoring a public rating of the replacement 3D object that is rendered in place of the 3D container;

determining that the public rating is below a predetermined rating threshold; and in response to the determination, replacing the replacement 3D object with a second replacement 3D object having a public rating above the predetermined threshold.

14. The method of claim 1, further comprising:

generating a first rendering in response to the request to render the scene data representing the 3D scene for the electronic device, wherein the first rendering incudes the 3D container in the scene data; and generating a second rendering, wherein the second rendering is the rendering of the scene data representing the 3D scene with the replacement 3D object in place of the 3D container rendered in the first rendering.

15. A system comprising:

an editor configured to enable design of scene data representing a 3D scene;

a 3D rendering engine configured to render the scene data representing the 3D scenes created by the editor;

a client device configured to transmit a request to the 3D rendering engine to render the scene data representing the 3D scene; and in response to receiving the request from the client device, the 3D rendering engine configured to:

receive a 3D container;

receive the scene data representing the 3D scene including the 3D container;

receive an indication that the 3D container in the scene data representing the 3D scene is to be replaced;

in response to the indication, determining one or more object attributes indicated by the 3D container;

determine one or more product selection requirements for the 3D container based on targeting parameters associated with the request to render the scene data;

select, based on the one or more object attributes indicated by the 3D container and the one or more product selection requirements, a replacement 3D object; and render the scene data representing the 3D scene, including rendering the replacement 3D object in place of the 3D container.

16. The system of claim 15, wherein the object attributes indicated by the 3D container are dimensions, and in response to the indication, selecting the replacement 3D object that is within the indicated dimensions.

17. The system of claim 15, wherein the selecting the replacement object comprises, the client device configured to:

transmit the one or more object attributes to one or more object servers;

receive a plurality of replacement 3D objects from the one or more object servers; and select one of the received 3D objects, from the plurality of 3D objects received, to render the selected replacement 3D object in place of the 3D container.

18. The system of claim 15, wherein selecting comprises, the client device configured to analyze the one or more object attributes to determine the replacement 3D object.

19. The system of claim 15, wherein an attribute, from the one of more attributes, is product category, wherein the client device configured to select the replacement 3D object that is of a same product category as the product category indicated by the 3D container.

20. The system of claim 15, wherein the one or more object attributes indicated by the 3D container is a rule for selecting the replacement 3D object.

21. The system of claim 15, further comprising, the client device configured to:

monitor a public rating of the replacement 3D object that is rendered in place of the 3D container;

determine that the public rating is below a predetermined rating threshold; and in response to the determination, replace the replacement 3D object with a second replacement 3D object having a public rating above the predetermined threshold.

22. The system of claim 15, further comprising, the client device configured to:

generate a first rendering in response to the request to render the scene data representing the 3D scene for the electronic device, wherein the first rendering incudes the 3D container in the scene data; and generate a second rendering, wherein the second rendering is the rendering of the scene data representing the 3D scene with the replacement 3D object in place of the 3D container rendered in the first rendering.

\* \* \* \* \*